(12) United States Patent
Kawashima et al.

(10) Patent No.: US 9,178,246 B2
(45) Date of Patent: Nov. 3, 2015

(54) NONAQUEOUS ELECTROLYTE BATTERY AND NONAQUEOUS ELECTROLYTE

(75) Inventors: Atsumichi Kawashima, Fukushima (JP); Haruo Watanabe, Kanagawa (JP); Noritoshi Araki, Fukushima (JP); Shuhei Sugita, Fukushima (JP); Shinichi Katayama, Fukushima (JP); Hideki Nakai, Fukushima (JP)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 13/034,952

(22) Filed: Feb. 25, 2011

(65) Prior Publication Data

US 2011/0217598 A1    Sep. 8, 2011

(30) Foreign Application Priority Data

Mar. 2, 2010  (JP) .............. P2010-044804
Oct. 18, 2010 (JP) .............. P2010-233925

(51) Int. Cl.
*H01M 10/0567*   (2010.01)
*H01M 10/0566*   (2010.01)
(Continued)

(52) U.S. Cl.
CPC .............. *H01M 10/02* (2013.01); *Y02E 60/122* (2013.01)

(58) Field of Classification Search
None
See application file for complete search history.

(56) References Cited

U.S. PATENT DOCUMENTS 7,709,142 B2   5/2010  Wakita et al.
8,652,577 B2   2/2014  Watanabe et al.
2009/0197184 A1  8/2009  Kawashima

FOREIGN PATENT DOCUMENTS

CN    101510599    8/2009
CN    101621139    1/2010
(Continued)

OTHER PUBLICATIONS

Chen, Y.G. et al., Lithium salts of heteropolyacid as the electrolyte of lithium-ion battery, Synthetic Metals, 135-136 (2003) 225-226.*

(Continued)

*Primary Examiner* — Cynthia K Walls
(74) *Attorney, Agent, or Firm* — K&L Gates LLP

(57) ABSTRACT

A nonaqueous electrolyte battery includes: a positive electrode; a negative electrode; a nonaqueous electrolyte that includes a solvent and an electrolyte salt, the solvent including a halogenated cyclic carbonate of the Formula (1) below, or at least one of unsaturated cyclic carbonates of the Formulae (2) and (3) below; and a polyacid and/or a polyacid compound contained in the battery,

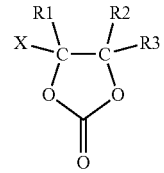

(1)

where X is a F group or a Cl group, R1 and R2 are each independently a $C_nH_{2n+1}$ group ($0 \le n \le 4$), and R3 is $C_nH_{2n+1-m}X_m$ ($0 \le n \le 4$, $0 \le m \le 2n+1$),

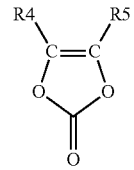

(2)

where R4 and R5 are each independently a $C_nH_{2n+1}$ group ($0 \le n \le 4$),

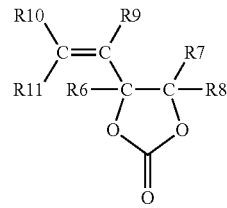

(3)

where R6 to R11 are each independently a $C_nH_{2n+1}$ group ($0 \le n \le 4$).

17 Claims, 12 Drawing Sheets

(51) Int. Cl.
*H01M 10/0564* (2010.01)
*H01M 10/02* (2006.01)

(56) References Cited

FOREIGN PATENT DOCUMENTS

| JP | 2002-289188 | * 10/2002 | ............. H01M 4/58 |
|---|---|---|---|
| JP | 2004-214116 | 7/2004 | |
| JP | 2006-085912 | 3/2006 | |
| JP | 2006-173014 | 6/2006 | |
| JP | 2006-216524 | 8/2006 | |
| JP | 2006-318815 | 11/2006 | |
| JP | 2007-103339 | 4/2007 | |
| JP | 2007-0188861 | 7/2007 | |
| JP | 2007-250415 | 9/2007 | |
| JP | 2009-004146 | 1/2009 | |
| JP | 2009-206073 | 9/2009 | |

OTHER PUBLICATIONS

Wang, A novel application of mixed-valence Keggin-type polyoxometalates as non-aqueous electrolytes in polyacenic semiconductor secondary batteries, Solid State Ionics, 156 (2003), 71-78.*

Hatakeyama, Improved performance of solid-state metal hydride batteries using heteropolyacid hydrate as on electrolyte, Electrochemistry, 72(10), 2004, 697-699.*

Lakshmi, Studies on proton conducting composite electrolytes based on salt hydrates, Solid State Ionics: New Developments, [Proceeding of the Asian Conference], 5th, Kandy, Sri Lanka, Dec. 2-7, 1996, 523-527, Editors: Chowdari, B. V. R., Dissanayake, M. A. K. L., Careem, M. A., World Scientific: Singapore, Singapore.*

Lira-Cantu (Electrochemical and chemical syntheses of the hybrid organic-inorganic electroactive material formed by phosphomolybdate and polyaniline. Application as cation-insertion electrodes, Chemistry of Materials, 1998, 10 (3), 698-704).*

Machine translation of JP 2002-289188, retrieved from <http://www19.ipdl.inpit.go.jp/PA1/cgi-bin/PA1INDEX> on Mar. 2, 2015.*

Chinese Office Action issued May 6, 2014, for corresponding Chinese Appln. No. 201110044110.4.

Japanese Patent Office, Grounds for refusal notice issued in connection with Japanese Patent Application No. 2010-233925, dated Apr. 1, 2014. (5 pages).

* cited by examiner

NONAQUEOUS ELECTROLYTE BATTERY AND NONAQUEOUS ELECTROLYTE

CROSS REFERENCES TO RELATED APPLICATIONS

The present application claims priority to Japanese Priority Patent Applications JP 2010-044804 and JP 2010-233925 filed in the Japan Patent Office on Mar. 2, 2010 and Oct. 18, 2010, respectively, the entire contents of which is hereby incorporated by reference.

BACKGROUND

This application relates to nonaqueous electrolyte batteries and nonaqueous electrolytes, specifically to nonaqueous electrolyte batteries and to nonaqueous electrolytes that include an organic solvent and an electrolyte salt and used for nonaqueous electrolyte batteries.

Efforts have been made to reduce the size and weight of portable electronic devices such as camera-integrated VTRs, digital still cameras, cell phones, personal digital assistances, and laptop computers. In this connection, there has been active research and development to improve the energy density of batteries, particularly secondary batteries, used as the portable power source of such electronic devices.

Lithium ion secondary batteries that use carbon, a lithium-transition metal composite oxide, and a carbonate ester mixture for the negative electrode active material, the positive electrode active material, and the electrolytic solution, respectively, have been put to a wide range of practical applications for their ability to provide greater energy density than other nonaqueous electrolytic solution secondary batteries such as lead batteries and nickel cadmium batteries.

Laminated lithium ion secondary batteries that use an aluminum laminate film for the exterior particularly have high energy density because of lightness. Laminated polymer lithium ion secondary batteries also have widespread use among the laminated lithium ion secondary batteries, because the polymer used for the battery swells with the electrolytic solution, and suppresses deformation of the laminated battery.

Increasing the thickness of the active material layer for higher capacity increases the amount of current per area density during charging, and the lithium ions cannot be inserted into the negative electrode active material in time. This has caused problems such as deposition of lithium metal on the negative electrode surface, and low percentage of remaining discharge capacity during repeated charge and discharge. As a solution for these problems, JP-A-2009-206073 (Patent Document 1) and JP-A-2007-188861 (Patent Document 2) propose suppressing decomposition of the electrolytic solution and thus improving charge and discharge cycle characteristics with the use of a protective coating formed on the negative electrode surface by adding, for example, halogenated cyclic carbonate or unsaturated cyclic carbonate to the electrolytic solution.

The materials used as the positive electrode active material of secondary batteries have, for example, a layered rock-salt crystal structure represented by the general Formula $Li_xMO_2$, such as lithium cobalt oxide (where M is at least one selected from aluminum (Al), manganese (Mn), cobalt (Co), and nickel (Ni). The composition of such positive electrode active material in the fully charged state is generally $Li_xMO_2$ (x=0.5). However, batteries that have compositions with x<0.5 during charging have also been developed for higher capacity. Techniques currently available to realize x less than 0.5 use either a nickel (Ni) content of 75% or more in the transition metal M under a charge voltage of 4.2 V, or a charge voltage of 4.3 V or more.

SUMMARY

The halogenated cyclic carbonate or unsaturated cyclic carbonate decomposes during high-temperature storage, and produces gas that swells the laminated lithium ion secondary battery. In cylindrical lithium ion secondary batteries equipped with a pressure activated safety valve, the pressure increase in the battery following gas production activates the pressure activated safety valve, and makes the battery useless.

Use of positive electrode active materials that contain large amounts of the transition metal nickel (Ni) for higher capacity is problematic, because the nickel-based composite oxide particles have many carbonate ions and cause more gas production from the composite oxide particles, even though discharge capacity can be improved. A problem of the battery charge voltage of 4.3 V or more is that it makes mainly the positive electrode surface more oxdizable, and increases gas production due to electrolyte decomposition.

Accordingly, there is a need for a nonaqueous electrolyte battery and a nonaqueous electrolyte with which charge and discharge cycle characteristics can be improved, and gas production during high-temperature storage can be suppressed.

According to one embodiment, there is provided a nonaqueous electrolyte battery that includes:

a positive electrode;

a negative electrode;

a nonaqueous electrolyte that includes a solvent and an electrolyte salt, the solvent including a halogenated cyclic carbonate of the Formula (1) below, or at least one of unsaturated cyclic carbonates of the Formulae (2) and (3) below; and a polyacid and/or a polyacid compound added inside the battery,

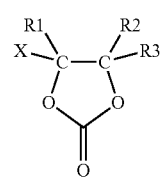
(1)

where X is a F group or a Cl group, R1 and R2 are each independently a $C_nH_{2n+1}$ group (0≤n≤4), and R3 is $C_nH_{2n+1-m}X_m$ (0≤n≤4, 0≤m≤2n+1),

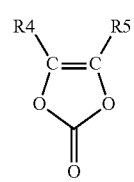
(2)

where R4 and R5 are each independently a $C_nH_{2n+1}$ group (0≤n≤4),

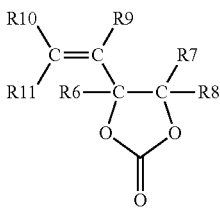

where R6 to R11 are each independently a $C_nH_{2n+1}$ group ($0 \le n \le 4$).

According to another embodiment, there is provided a nonaqueous electrolyte battery that includes:
a positive electrode;
a negative electrode; and
a nonaqueous electrolyte that includes a solvent and an electrolyte salt,
wherein the negative electrode includes:
a gelled first negative electrode coating that contains an amorphous polyacid and/or an amorphous polyacid compound including one or more polyelements; and
a second negative electrode coating that originates from a halogenated cyclic carbonate of the Formula (1) below, or in at least one of unsaturated cyclic carbonates of Formulae (2) and (3) below,

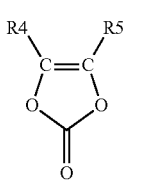
(1)

where X is a F group or a Cl group, R1 and R2 are each independently $C_nH_{2n+1}$ group ($0 \le n \le 4$), and R3 is $C_nH_{2n+1-m}X_m$ ($0 \le n \le 4$, $0 \le m \le 2n+1$), (2)

where R4 and R5 are each independently a $C_nH_{2n+1}$ group ($0 \le n \le 4$),

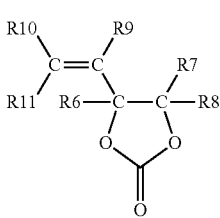
(3)

where R6 to R11 are each independently a $C_nH_{2n+1}$ group ($0 \le n \le 4$).

According to still another embodiment, there is provided a nonaqueous electrolyte that includes:
a solvent;
an electrolyte salt; and
a polyacid and/or a polyacid compound,
wherein the solvent includes a halogenated cyclic carbonate of the Formula (1) below, or at least one of unsaturated cyclic carbonates of the Formulae (2) and (3) below,

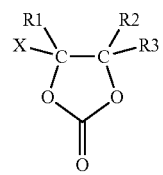
(1)

where X is a F group or a Cl group, R1 and R2 are each independently a $C_nH_{2n+1}$ group ($0 \le n \le 4$), and R3 is $C_nH_{2n+1-m}X_m$ ($0 \le n \le 4$, $0 \le m \le 2n+1$),

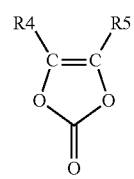
(2)

where R4 and R5 are each independently a $C_nH_{2n+1}$ group ($0 \le n \le 4$),

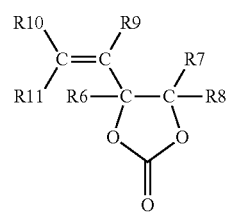
(3)

where R6 to R11 are each independently a $C_nH_{2n+1}$ group ($0 \le n \le 4$).

In the foregoing embodiments, charging provides the negative electrode with a coating that originates from the halogenated cyclic carbonate of Formula (1) or in at least one of the unsaturated cyclic carbonates of Formulae (2) and (3). The coating suppresses decomposition of the electrolytic solution components, and thus suppresses degradation of charge and discharge cycle characteristics. Charging also provides the negative electrode with a coating that originates from the heteropolyacid and/or heteropolyacid compound added inside the battery. In this way, decomposition of the halogenated cyclic carbonate of Formula (1) or the unsaturated cyclic carbonates of Formulae (2) and (3), and gas production during high-temperature storage can be suppressed under a high temperature environment.

In the foregoing another embodiment, the second negative electrode coating that originates from the halogenated cyclic carbonate of Formula (1) or in at least one of the unsaturated cyclic carbonates of Formulae (2) and (3), and formed on the negative electrode suppresses decomposition of the electrolytic solution components, and degradation of charge and discharge cycle characteristics. The gelled first negative electrode coating that contains an amorphous polyacid and/or an amorphous polyacid compound including one or more polyelements, and formed on the negative electrode suppresses decomposition of the halogenated cyclic carbonate of Formula (1) or the unsaturated cyclic carbonates of Formulae (2) and (3), and gas production during high-temperature storage under a high temperature environment.

With the embodiments of the present application, charge and discharge cycle characteristics can be improved, and gas production during high-temperature storage can be suppressed.

Additional features and advantages are described herein, and will be apparent from the following Detailed Description and the figures.

DETAILED DESCRIPTION

Embodiments of the present application will be described below in detail with reference to the drawings.

1. First Embodiment (First example of nonaqueous electrolyte battery)
2. Second Embodiment (Second example of nonaqueous electrolyte battery)
3. Third Embodiment (Third example of nonaqueous electrolyte battery)
4. Fourth embodiment (Fourth example of nonaqueous electrolyte battery)
5. Fifth embodiment (Fifth example of nonaqueous electrolyte battery)
6. Other Embodiments (Variations)

1. First Embodiment (Battery Configuration)

Figure 1:
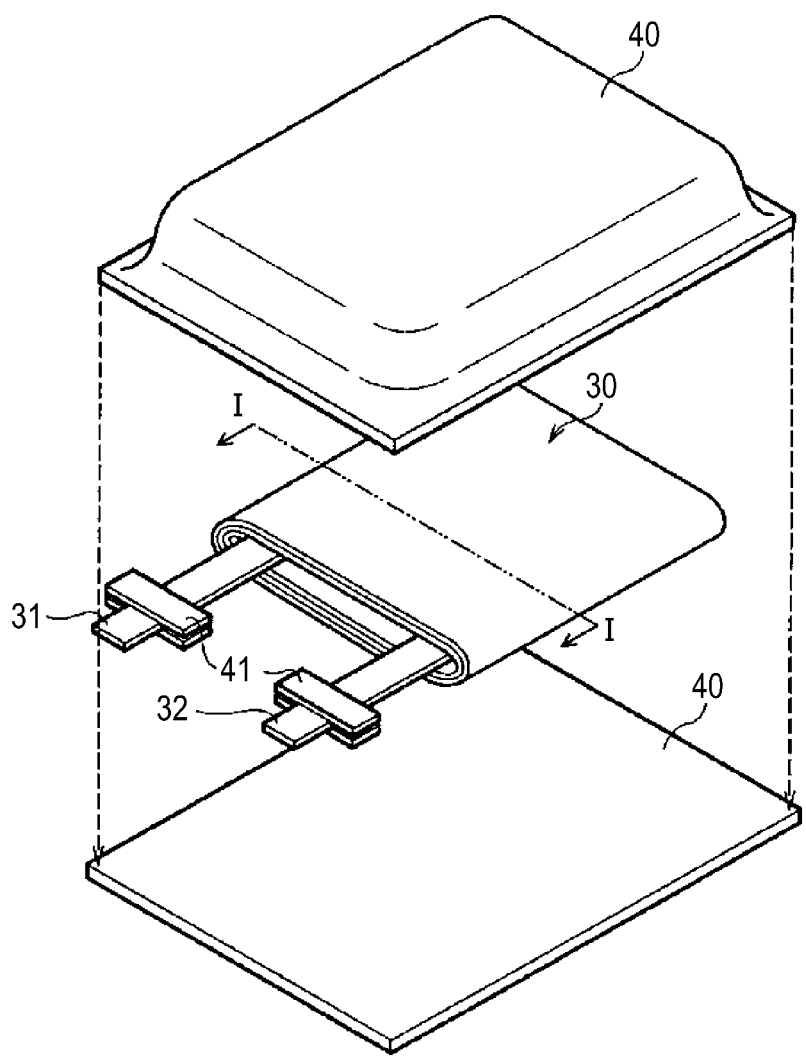
FIG. 1 is an exploded perspective view illustrating an exemplary configuration of a nonaqueous electrolyte battery according to an embodiment.
Figure 2:
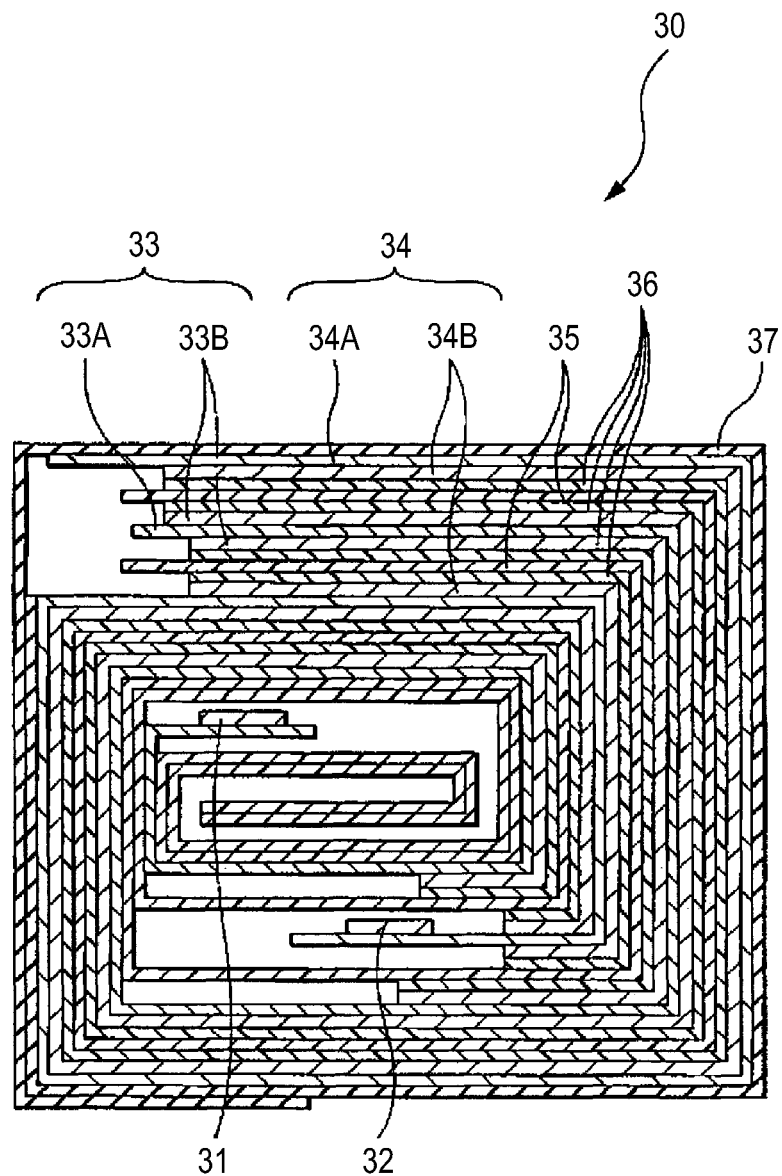
FIG. 2 is a cross sectional view of the wound electrode unit of FIG. 1 taken along the line I-I.

A nonaqueous electrolyte battery according to First Embodiment is described. FIG. 1 is an exploded perspective view representing a configuration of the nonaqueous electrolyte battery according to First Embodiment. FIG. 2 is a magnified cross sectional view of a wound electrode unit 30 of FIG. 1 at the line I-I.

The nonaqueous electrolyte battery is basically structured to include a film-like exterior member 40, and a wound electrode unit 30 housed in the exterior member 40 with a positive electrode lead 31 and a negative electrode lead 32 attached to the wound electrode unit 30. The battery structure using the film-like exterior member 40 is called a laminate film structure.

For example, the positive electrode lead 31 and the negative electrode lead 32 lead out in the same direction out of the exterior member 40. The positive electrode lead 31 is formed using, for example, metallic material such as aluminum. The negative electrode lead 32 is formed using, for example, metallic material such as copper, nickel, and stainless steel. These metallic materials are formed into, for example, a thin plate or a mesh.

The exterior member 40 is formed using, for example, an aluminum laminate film that includes a nylon film, an aluminum foil, and a polyethylene film laminated in this order. For example, the exterior member 40 is structured from a pair of rectangular aluminum laminate films fused or bonded with an adhesive at the peripheries with the polyethylene films facing the wound electrode unit 30.

An adhesive film 41 that prevents entry of external air is inserted between the exterior member 40 and the positive and negative electrode leads 31 and 32. The adhesive film 41 is configured using a material that has adhesion to the positive electrode lead 31 and the negative electrode lead 32. Examples of such material include polyolefin resins such as polyethylene, polypropylene, modified-polyethylene, and modified-polypropylene.

The exterior member 40 may be configured from laminate films of other laminate structures, instead of the aluminum laminate film, or from a polypropylene or other polymer films, or metal films.

FIG. 2 is a cross section of the wound electrode unit 30 of FIG. 1, taken along the line I-I. The wound electrode unit 30 is a wound unit of a positive electrode 33 and a negative electrode 34 laminated via a separator 35 and an electrolyte 36. The outermost periphery of the wound electrode unit 30 is protected by a protective tape 37.

(Positive Electrode)

The positive electrode 33 is structured from, for example, a positive electrode active material layer 33B provided on the both sides of a double-sided positive electrode collector 33A. The positive electrode active material layer 33B may be provided only on one side of the positive electrode collector 33A.

The positive electrode collector 33A is configured using, for example, metallic material such as aluminum, nickel, and stainless steel.

The positive electrode active material layer 33B includes positive electrode active material, which is one or more positive electrode materials capable of storing and releasing lithium. Other materials such as a binder and a conductive agent also may be contained, as required.

Preferred examples of positive electrode material that can store and release lithium include: lithium composite oxides such as lithium cobalt oxide, lithium nickel oxide, solid solutions of these {for example, Li(Ni$_x$Co$_y$Mn$_z$)O$_2$ (x, y, and z satisfy 0<x<1, 0<y<1, 0≤z<1, x+y+z=1), Li(Ni$_x$Co$_y$Al$_z$)O$_2$ (x, y, and z satisfy 0<x<1, 0<y<1, 0≤z<1, x+y+z=1)}, spinel manganese (LiMn$_2$O$_4$), and solid solutions of these {Li(Mn$_{2-v}$Ni$_v$)O$_4$ (v<2)}; and phosphoric acid compounds of an olivine structure, such as lithium iron phosphate (LiFePO$_4$), and Li$_x$Fe$_{1-y}$M2$_y$PO$_4$ (where M2 represents at least one selected from manganese (Mn), nickel (Ni), cobalt (Co), zinc (Zn), and magnesium (Mg), and 0.9≤x≤1.1). These are preferable for their ability to produce high energy density.

A positive electrode material produced by the coating treatment of lithium cobalt oxide, lithium nickel oxide, or solid solutions of these used as matrix particles may be used as the positive electrode active material. Specifically, for example, a positive electrode material produced by coating at least part of the matrix particle surfaces with phosphoric acid compounds such as lithium phosphate (Li$_3$PO$_4$) and lithium iron phosphate (LiFePO$_4$) may be used as the positive electrode active material. Swelling that might occur during high-temperature storage can be suppressed with the use of such positive electrode materials, because the phosphoric acid compound suppresses the electrolytic solution from contacting the matrix particles, and allows for conduction of only lithium ions. The coating treatment is performed by, for example, mixing the phosphoric acid compound with lithium cobalt oxide, lithium nickel oxide, or solid solutions of these using a ball milling machine.

Other examples of positive electrode material that can store and release lithium include: oxides such as titanium oxide, vanadium oxide, and manganese dioxide; disulfides such as iron disulfide, titanium disulfide, and molybdenum sulfide; sulfur; and conductive polymers such as polyaniline and polythiophene.

The positive electrode material that can store and release lithium may be other than these examples.

Examples of the binder include synthetic rubbers such as styrenebutadiene rubber, fluorine rubber, and ethylene propylene diene; and polymer materials such as polyvinylidene fluoride. These may be used alone or as a mixture of one or more.

Examples of the conductive agent include carbon materials such as graphite and carbon black. These may be used alone or as a mixture of one or more.

The positive electrode active material layer 33B has a thickness of preferably 40 μm or more on each side, from the perspective of realizing high capacity.

(Negative Electrode)

The negative electrode 34 is structured to include, for example, a negative electrode active material layer 34B provided on the both sides of a double-sided negative electrode collector 34A. The negative electrode active material layer 34B may be provided only on one side of the negative electrode collector 34A.

The negative electrode collector 34A is configured using, for example, metallic material such as copper, nickel, and stainless steel.

The negative electrode active material layer 34B includes a negative electrode active material, which may be one or more negative electrode materials capable of storing and releasing lithium. Other materials such as a binder and a conductive agent also may be contained, as required. The same binder and conductive agent described in conjunction with the positive electrode can be used.

The negative electrode material that can store and release lithium may be, for example, carbon material. Examples of carbon material include easily graphitizable carbon, non-graphitizable carbon having a (002) plane distance of 0.37 nm or more, and graphite having a (002) plane distance of 0.34 nm or less. Specific examples include pyrolyzed carbons, cokes, glass-like carbon fibers, organic polymer compound calcined products, activated carbons, and carbon blacks. Cokes include pitch cokes, needle cokes, and petroleum cokes. The organic polymer compound calcined products refer to carbonized products obtained by calcining phenol resin, furan resin, or the like at appropriate temperatures. Carbon materials are preferred because they undergo a very few changes in crystal structure in the storage and release of lithium, and thus provide high energy density and excellent cycle characteristics, in addition to serving as conductive agents. The carbon material may be fibrous, spherical, granular, or scale-like in shape.

Aside from the carbon material, the negative electrode material that can store and release lithium may be, for example, material that, in addition to being capable of storing and releasing lithium, includes at least one of a metallic element and a semi-metallic element as the constituting element, because such materials also provide high energy density. Such negative electrode materials may include a metallic element or a semi-metallic element either alone or as an alloy or a compound, or may at least partially include one or more phases of these. As used herein, the "alloy" encompasses an alloy or two or more metallic elements, and an alloy of one or more metallic elements and one or more semi-metallic elements. Further, the "alloy" may include a non-metallic element. The composition may be a solid solution, a eutectic (eutectic mixture), or an intermetallic compound, or a mixture of two or more of these.

The metallic and semi-metallic elements are, for example, those capable of forming an alloy with lithium. Specific examples include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). At least one of silicon and tin is preferable, and silicon is mote preferable, because these elements are highly capable of storing and releasing lithium, and can provide high energy density.

Examples of negative electrode material that includes at least one of silicon and tin include silicon, either alone or as an alloy or a compound, tin, either alone or as an alloy or a compound, and materials that at least partially include one or more phases of these.

Examples of silicon alloy include those including at least one non-silicon second constituting element selected from tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of tin alloy include those including at least one non-tin (Sn) second constituting element selected from silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of tin compound and silicon compound include those containing, for example, oxygen (O) or carbon (C). The tin compound and the silicon compound may optionally include the second constituting elements exemplified above, in addition to tin (Sn) or silicon (Si).

Particularly preferred as the negative electrode material that includes at least one of silicon (Si) and tin (Sn) is, for example, a material that includes tin (Sn) as a first constituting element, and a second and a third constituting element in addition to first constituting element tin (Sn). The negative electrode material may be used together with the negative electrode materials exemplified above. The second constituting element is at least one selected from cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). The third constituting element is at least one selected from boron (B), carbon (C), aluminum (Al), and phosphorus (P). Inclusion of the second and third elements improves cycle characteristics.

A CoSnC-containing material is particularly preferable that includes tin (Sn), cobalt (Co), and carbon (C) as the constituting elements, and in which the carbon (C) content ranges from 9.9 mass % to 29.7 mass %, inclusive, and in which the proportion of cobalt (Co) in the total of tin (Sn) and cobalt (Co) (Co/(Sn+Co)) ranges from 30 mass % to 70 mass %, inclusive. High energy density and excellent cycle characteristics can be obtained with these composition ranges.

The SnCoC-containing material may optionally include other constituting elements, as required. Preferred examples of other constituting elements include silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi), which may be contained in combinations of two or more. Inclusion of these elements further improves capacity characteristics or cycle characteristics.

It is preferable that the SnCoC-containing material include a tin (Sn)-, cobalt (Co)-, and carbon (C)-containing phase, and that this phase have a low-crystalline or amorphous structure. Further, in the SnCoC-containing material, it is preferable that the constituting element carbon at least partially bind to the other constituting elements, namely, metallic elements or semi-metallic elements. Bonding of the carbon with other elements suppresses agglomeration or crystallization of tin (Sn) or other elements, which is considered to lower cycle characteristics.

The state of element binding can be measured by, for example, X-ray photoelectron spectroscopy (XPS). In XPS, the peak of the carbon 1s orbital (C1s) appears at 284.5 eV for graphite, when the device used is calibrated to provide a peak of the gold atom 4f orbital (Au4f) at 84.0 eV. The peak appears at 284.8 eV in surface-contaminated carbon. In contrast, when the carbon element charge density is high as in, for example, the carbon binding to a metallic element or a semi-metallic element, the C1s peak appears in a region below 284.5 eV. That is, when the C1s synthetic wave peak for SnCoC-containing material appears in a region below 284.5 eV, the carbon (C) contained in the SnCoC-containing material is at least partially binding to the other constituting elements, namely, the metallic element or the semi-metallic element.

Note that XPS uses, for example, a C1s peak for the calibration of the spectral energy axis. Generally, because the surface-contaminated carbon is present on the surface, the C1s peak of the surface-contaminated carbon is set to 284.8 eV, and used as the reference energy. In XPS, because the waveform of the C1s peak is obtained as the waveform that contains the peak of the surface-contaminated carbon and the peak of the carbon contained in the SnCoC-containing material, the peak of the surface-contaminated carbon and the peak of the carbon contained in the SnCoC-containing material are separated using, for example, commercially available software. In the waveform analysis, the position of the main peak on the lowest binding energy side is used as the reference energy (284.8 eV).

Other examples of the negative electrode material that can store and release lithium include metal oxides and polymer compounds that are capable of storing and releasing lithium. Examples of such metal oxides include iron oxide, ruthenium oxide, and molybdenum oxide. Examples of such polymer compounds include polyacetylene, polyaniline, and polypyrrole.

Further, the negative electrode material that can store and release lithium may be material, such as titanium, that forms a composite oxide with lithium.

Use of lithium metal as the negative electrode active material is also possible, and the lithium metal may be deposited and dissolved. The metal deposited and dissolved may be non-lithium metals such as magnesium and aluminum.

The negative electrode active material layer 34B may be formed using, for example, any of a vapor-phase method, a liquid-phase method, a spray method, a calcining method, and coating, either individually or in combinations of two or more. The vapor-phase method may be, for example, a physical deposition method or a chemical deposition method, specifically, a vacuum deposition method, a sputter method, an ion plating method, a laser abrasion method, a chemical vapor deposition (CVD) method, or a plasma chemical vapor deposition method. Known techniques such as electroplating and non-electrolytic plating can be used as the liquid-phase method. The calcining method is a method in which, for example, a particulate negative electrode active material is mixed with other components such as a binder, dispersed in a solvent, and coated before it is subjected to a heat treatment at a temperature higher than the melting point of, for example, the binder. The calcining method also can be performed using known techniques, for example, such as an atmosphere calcining method, a reactive calcining method, and a hot-press calcining method.

When using lithium metal as the negative electrode active material, the negative electrode active material layer 34B may be provided at the time of assembly, or may be formed after the assembly from the lithium metal that has deposited during the charging. Further, the negative electrode active material layer 34B may be used as a collector, instead of the negative electrode collector 34A.

(Separator)

The separator 35 is provided to isolate the positive electrode 33 and the negative electrode 34 from each other, and allows for passage of lithium ions while preventing current shorting caused by contacting of the electrodes. The separator 35 is configured using, for example, a porous film of synthetic resin such as polytetrafluoroethylene, polypropylene, and polyethylene, or a ceramic porous film. The separator 35 may be a laminate of two or more of these porous films.

(Electrolyte)

The electrolyte 36 is so-called a gel electrolyte that includes an electrolytic solution, and a polymer compound that swells by absorbing the electrolytic solution. In the gel electrolyte, the electrolytic solution is retained in the polymer compound. The gel electrolyte is preferable, because it provides high ion conductivity, and prevents leaking.

(Electrolytic Solution)

The electrolytic solution includes a solvent, and an electrolyte salt dissolved in the solvent. A heteropolyacid and/or a heteropolyacid compound are added to the electrolytic solution in advance. Thus, the electrolytic solution includes a heteropolyacid and/or a heteropolyacid compound dissolved in the solvent, prior to charging and discharging.

(Solvent)

The solvent includes a halogenated cyclic carbonate of the Formula (1) below, or at least one of unsaturated cyclic carbonates of the Formulae (2) and (3) below.

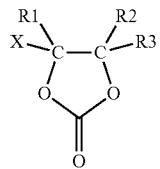
(1)

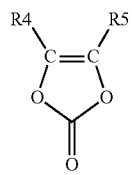
(2)

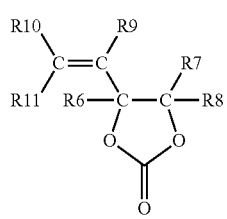
(3)

(Halogenated Cyclic Carbonates)

Specific examples of the halogenated cyclic carbonate of Formula (1) include 4-fluoro-1,3-dioxolan-2-one (fluoroethylene carbonate (FEC)) of the Formula (4) below, 4-chloro-1,3-dioxolan-2-one (chloroethylene carbonate (CEC)) of the Formula (5) below, and trans-4,5-difluoro-1,3-dioxolan-2-one (trans-difluoroethylene carbonate (DFEC)) of the Formula (6) below. These may be used either alone or in combinations of two or more.

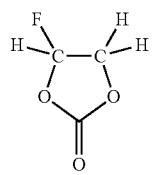
(4)

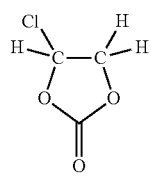
(5)

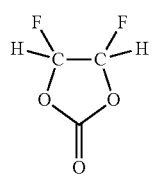
(6)

(Unsaturated Cyclic Carbonates)

Specific examples of unsaturated cyclic carbonates of Formulae (2) and (3) include vinylene carbonate (VC) of the Formula (7) below, and vinyl ethylene carbonate (VEC) of the Formula (8) below. These may be used either alone or in combinations of two or more.

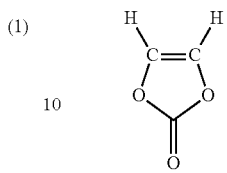
(7)

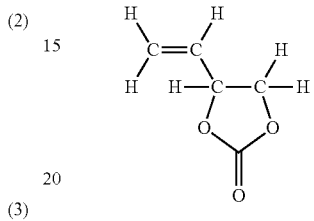
(8)

The solvent may contain other solvents, in addition to the halogenated cyclic carbonate of Formula (1) or at least one of the unsaturated cyclic carbonates of Formulae (2) and (3). Other solvents may be, for example, high-dielectric-constant solvents. Examples of high-dielectric-constant solvent include cyclic carbonate esters such as ethylene carbonate. Other examples of high-dielectric-constant solvent include lactones such as γ-butyrolactone and γ-valerolactone; lactams such as N-methylpyrrolidone; cyclic carbamic acid esters such as N-methyloxazolidinone; and sulfone compounds such as tetramethylenesulfone, which may be used in place of, or in addition to, cyclic carbonate esters.

Other solvents may be used as a mixture with a high-dielectric-constant solvent and a low-viscosity solvent. Examples of low-viscosity solvent include chain carbonate esters such as ethylmethyl carbonate, diethyl carbonate, dimethyl carbonate, and methylpropyl carbonate; chain carboxylic acid esters such as methyl acetate, ethyl acetate, methyl propionate, ethyl propionate, methyl butyrate, isomethyl butyrate, trimethylmethyl acetate, and trimethylethyl acetate; chain amides such as N,N-dimethylacetamide; chain carbamic acid esters such as N,N-diethylcarbamic acid methyl, and N,N-diethylcarbamic acid ethyl; and ethers such as 1,2-dimethoxyethane, tetrahydrofuran, tetrahydropyran, and 1,3-dioxolan. Other solvents are not limited to the compounds exemplified above, and a wide range of proposed compounds can be used.

(Electrolyte Salt)

The electrolyte salt includes, for example, one or more light metal salts such as lithium salts.

Examples of lithium salts include inorganic lithium salts such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchloride ($LiClO_4$), and lithium aluminum tetrachloride ($LiAlCl_4$). Other examples of lithium salts include lithium salts of perfluoroalkane sulfonic acid derivatives, such as lithium trifluoromethanesulfonate ($CF_3SO_3Li$), lithium bis(trifluoromethanesulfone)imide (($CF_3SO_2)_2NLi$), lithium bis(pentafluoromethanesulfone)imide (($C_2F_5SO_2)_2NLi$), and lithium tris(trifluoromethanesulfone)methide (($CF_3SO_2)_3CLi$).

The preferred lithium salts are boron-containing lithium salts such as lithium tetrafluoroborate ($LiBF_4$), and $LiB(C_2O_4)_2$. Use of a boron-containing lithium salt as the lithium salt further suppresses swelling during high-temperature storage. By forming a coating on the positive electrode 33, the boron-containing lithium salt can suppress the decomposition and gasification of the solvent.

(Polyacid, Polyacid Compound)
(Heteropolyacid, Heteropolyacid Compound)

Heteropolyacid is a condensation product of two or more oxoacids. The preferred heteropolyacid and heteropolyacid compound are those of, for example, the Keggin structure, the Anderson structure, or the Dawson structure, in which the heteropolyacid ions easily dissolve in the battery solvent. Heteropolyacids and heteropolyacid compounds of the Keggin structure are more preferred for their property to more easily dissolve in the solvent.

The heteropolyacid and/or heteropolyacid compound may be those including either a polyatom selected from element group (a), or a polyatom selected from element group (a), and in which some of the polyatoms are replaced with at least one selected from element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Further, the heteropolyacid and/or heteropolyacid compound may be those including either a heteroatom selected from element group (c), or a heteroatom selected from element group (c), and in which some of the heteroatoms are replaced with at least one selected from element group (d).

Element group (c): B, Al, Si, P, Cr, Mn, Fe, Co, Ni, Cu, Zn, Ge, As
Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, Np Specifically, the heteropolyacid and/or heteropolyacid compound may be heteropolyacids and/or heteropolyacid compounds of the Formulae (A) to (D) below. Of these, the lithium salt is preferable for its ability to further suppress gas production. The following Formula (A) is of the Keggin structure.

$$H_xA_y[BD_{12}O_{40}]\cdot zH_2O \qquad \text{Formula (A): Keggin structure}$$

(In the Formula, A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt. B represents phosphorus (P), silicon (Si), arsenic (As), or germanium (Ge). D is at least one element selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), thallium (Tl). The variables x, y, and z satisfy $0 \le x \le 4$, $0 \le y \le 4$, $0 \le z \le 50$, where at least one of x and y is not 0.)

Specifically, the following compounds of Formulae (A1) to (A3) can be used as the heteropolyacid and/or heteropolyacid compound of the Keggin structure.

$$X_4YZ_{12}O_{40} \qquad \text{Formula (A1)}$$

X=H, Li, Na, K, Rb, Cs, $NR_4$: $R=C_nH_{2n+1}$ ($0 \le n \le 4$)
Y=Si, Ge
Z=Mo, W $$X_3YZ_{12}O_{40} \qquad \text{Formula (A2)}$$

X=H, Li, Na, K, Rb, Cs, $NR_4$: $R=C_nH_{2n+1}$ ($0 \le n \le 4$)
Y=P, As
Z=Mo, W $$X_4YZ_{11}VO_{40} \qquad \text{Formula (A3)}$$

X=H, Li, Na, K, Rb, Cs, $NR_4$: $R=C_nH_{2n-1}$ ($0 \le n \le 4$)
Y=P, As
Z=Mo, W

Aside from the heteropolyacid and/or heteropolyacid compound of the Keggin structure, the heteropolyacids and/or heteropolyacid compounds of the Anderson structure, the Dawson structure, or the Preyssler structure of the following Formulae (B) to (D) may be used.

$$H_xA_y[BD_6O_{24}]\cdot zH_2O \qquad \text{Formula (B): Anderson structure}$$

(In the Formula, A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt. B represents phosphorus (P), silicon (Si), arsenic (As), or germanium (Ge). D is at least one element selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \le x \le 8$, $0 \le y \le 8$, $0 \le z \le 50$, where at least one of x and y is not 0.)

$$H_xA_y[B_2D_{18}O_{62}]\cdot zH_2O \qquad \text{Formula (C): Dawson structure}$$

(In the Formula, A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt. B represents phosphorus (P), silicon (Si), arsenic (As), or germanium (Ge). D is at least one element selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \le x \le 8$, $0 \le y \le 8$, $0 \le z \le 50$, where at least one of x and y is not 0.)

$$H_xA_y[B_5D_{30}O_{110}]\cdot zH_2O \qquad \text{Formula (D): Preyssler structure}$$

(In the Formula, A represents lithium (Li), sodium (Na), potassium (K), rubidium (Rb), cesium (Cs), magnesium (Mg), calcium (Ca), aluminum (Al), ammonium (NH4), an ammonium salt, or a phosphonium salt. B represents phosphorus (P), silicon (Si), arsenic (As), or germanium (Ge). D is at least one element selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \le x \le 15$, $0 \le y \le 15$, $0 \le z \le 50$, where at least one of x and y is not 0.)

The amounts of heteropolyacid and/or heteropolyacid compound added to the electrolytic solution are not particularly limited. However, considering the balance between the effect of suppressing gas production and the effect of improving cycle characteristics, the heteropolyacid and/or heteropolyacid compound are added to the electrolytic solution in amounts of from 0.5 wt % to 5 wt %, inclusive, more preferably from 1.5 wt % to 5 wt %, inclusive.

Specific examples of heteropolyacid include heteropolytungstic acids such as phosphotungstic acid and silicotungstic acid, and heteropolymolybdic acids such as phosphomolybdic acid and silicomolybdic acid. Examples of heteropolyacid compound include heteropolytungstic acid compounds such as sodium silicotungstate, sodium phosphotungstate, and ammonium phosphotungstate. Other examples of heteropolyacid compound include heteropolymolybdic acid compounds such as sodium phosphomolybdate, and ammonium phosphomolybdate. These heteropolyacids and heteropolyacid compounds may be used in combinations of two or more. Because these heteropolyacids and heteropolyacid compounds easily dissolve in the solvent and stably exist in the battery, they are unlikely to cause adverse effects, for example, by reacting with the other materials. Examples of heteropolyacid and/or heteropolyacid compound containing more than one polyelement include phosphovanadomolybdic acid, phosphotungstomolybdic acid, and silicotungstomolybdic acid. The heteropolyacid compound preferably includes cations, for example, such as Li+, Na+, K+, Rb+, Cs+, R4N+, and R4P+ (R is H or a hydrocarbon group of 10 or less carbon atoms). Preferably, the cation is Li+, tetra-n-butylammonium, or tetra-n-butylphosphonium. Examples of such heteropolyacid compounds include heteropolytungstic acid compounds such as sodium silicotungstate, sodium phosphotungstate, ammonium phosphotungstate, and tetra-tetra-n-butyl phosphonium silicotungstate. Other examples of heteropolyacid compound include heteropolymolybdic acid compounds such as sodium phosphomolybdate, ammonium phosphomolybdate, and tri-tetra-n-butyl ammonium phosphomolybdate. Examples of the compound that includes more than one polyacid include materials such as tri-tetra-n-ammonium phosphotungstomolybdate. The heteropolyacids and heteropolyacid compounds may be used as mixtures of two or more. Because these heteropolyacids and heteropolyacid compounds easily dissolve in the solvent and stably exist in the battery, there are unlikely to cause adverse effects, for example, by reacting with the other materials.

Aside from the heteropolyacids and/or heteropolyacid compounds exemplified above, the polyacid and/or polyacid compound may be, for example, an isopolyacid and/or an isopolyacid compound that include one polyatom, or a polyacid and/or a polyacid compound that do not include a heteroatom but include one or more polyatoms, such as a polyacid and/or a polyacid compound that include two or more polyatoms but do not include a heteroatom.

For example, such polyacids and/or polyacid compounds may be those not including a heteroatom but including a polyatom selected from element group (a), or those including a polyatom selected from element group (a), and in which some of the polyatoms are replaced with at least one element selected from element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Specific examples include tungstic acid(VI), and molybdic acid(VI), more specifically tungstic anhydride, molybdenum anhydride, and hydrates of these. Examples of hydrates include ortho-tungstic acids ($H_2WO_4$), specifically tungstic acid monohydrate ($WO_3 \cdot H_2O$); and ortho-molybdic acids ($H_2MoO_4$), specifically molybdic acid dihydrates ($H_4MoO_5$, $H_2MoO_4 \cdot H_2O$, $MoO_3 \cdot 2H_2O$), and molybdic acid monohydrate ($MoO_3 \cdot H_2O$). It is also possible to use tungstic anhydride ($WO_3$) having less, ultimately zero, hydrogen content than isopolyacids of the foregoing hydrates, such as meta-tungstic acid and para-tungstic acid, or molybdenum anhydride ($MoO_3$) having less, ultimately zero, hydrogen content than meta-molybdic acid, para-molybdic acid, and the like.

Use of heteropolyacids and/or heteropolyacid compounds as the polyacids and/or polyacid compounds is preferable, because they have high solubility, for example, to the solvent used to adjust the positive electrode mixture and the negative electrode mixture, and to the nonaqueous solvent used for the electrolyte. The polyacids and/or polyacid compounds that do not contain heteroatoms tend to be slightly less effective than heteropolyacids and/or heteropolyacid compounds per added weight. However, because of low solubility to polar solvents, the polyacids and/or polyacid compounds that do not contain heteroatoms excel in coating characteristics such as coating viscoelasticity and aging when used for the positive electrode and the negative electrode, and are therefore useful from the industrial standpoint.

(Behaviors of Polyacid and/or Polyacid Compound, and Halogenated or Unsaturated Cyclic Carbonate in Response to Charging)

The behavior of the polyacid and/or polyacid compound in response to the charging of a nonaqueous electrolyte battery that includes the halogenated cyclic carbonate of Formula (1) or at least one of the unsaturated cyclic carbonates of Formulae (2) and (3), and the polyacid and/or polyacid compound added in advance to the electrolytic solution. In the following, descriptions will be made based on a nonaqueous electrolyte battery in which the polyacid and/or polyacid compound added in advance to the electrolytic solution are the heteropolyacid and/or heteropolyacid compound. In the nonaqueous electrolyte battery using the electrolytic solution that includes the halogenated cyclic carbonate of Formula (1) or at least one of the unsaturated cyclic carbonates of Formulae (2) and (3), and the heteropolyacid and/or heteropolyacid compound added in advance, a coating that originates from these compounds is formed on the negative electrode 34 by initial charging or preliminary charging. Note that, for convenience of explanation, the halogenated cyclic carbonate of Formula (1) or the unsaturated cyclic carbonates of Formulae (2) and (3) will be appropriately referred to as halogenated or unsaturated cyclic carbonates of Formulae (1) to (3).

Specifically, in response to initial charging or preliminary charging, the heteropolyacid and/or heteropolyacid compound in the electrolytic solution undergo electrolysis, and as a result the compounds that originate from the heteropolyacid and/or heteropolyacid compound deposit on the surface of the negative electrode 34 and form an inorganic coating. Further, the halogenated or unsaturated cyclic carbonates of Formulae (1) to (3) undergo a reductive decomposition reaction as a result of charging, and a coating that originates from the halogenated or unsaturated cyclic carbonates of Formulae (1) to (3) is formed on the negative electrode 34.

These coatings have a bilayer structure, because the heteropolyacid and/or heteropolyacid compound, and the halogenated or unsaturated cyclic carbonates of Formulae (1) to (3) have different reaction potentials. Specifically, the inorganic coating that originates from the heteropolyacid and/or heteropolyacid compound forms a deeper layer (the layer closer to the negative electrode surface), and the coating that originates from the halogenated or unsaturated cyclic carbonates of Formulae (1) to (3) forms a surface layer (the layer farther away from the negative electrode surface).

The compounds that originate from the heteropolyacid and/or heteropolyacid compound and deposit on the negative electrode 34 include, for example, a polyacid and/or polyacid compound having one or more polyatoms, or reduced products of such polyacids and/or polyacid compounds, that are produced by the electrolysis of the heteropolyacid and/or heteropolyacid compound, and have poorer solubility than the heteropolyacid and/or heteropolyacid compound.

Specifically, the polyacid and/or polyacid compound that deposit on the surface of the negative electrode 34 are amorphous, and exist on the negative electrode surface as, for example, a gelled negative electrode coating formed by absorbing the nonaqueous electrolyte. The deposit including the polyacid and/or polyacid compound grows and deposits into, for example, a three-dimensional mesh structure at the time of preliminary charging or charging. The deposited polyacid and/or polyacid compound may be at least partially reduced.

The presence or absence of the inorganic coating that originates from the heteropolyacid and/or heteropolyacid compound can be confirmed by checking the negative electrode 34 removed by disassembling the nonaqueous electrolyte battery after charging or preliminary charging. For example, the deposition of the polyacid and/or polyacid compound confirmed upon checking the composition of the deposit formed on the negative electrode collector 34A conveniently implies that the polyacid and/or polyacid compound have also deposited on the negative electrode active material layer 34B, confirming the formation of an inorganic coating that originates from the heteropolyacid and/or heteropolyacid compound.

The presence or absence of the polyacid and/or polyacid compound, or the presence or absence of the coating that originates from the halogenated or unsaturated cyclic carbonates of Formulae (1) to (3) can be confirmed by, for example, X-ray photoemission spectroscopy (XPS) analysis or time-of-flight secondary ion mass spectrometry (ToF-SIMS). In this case, the battery is washed with dimethyl carbonate after disassembling the battery. The battery is washed to remove the low volatile solvent component and the electrolyte salt present on the surface. Preferably, sampling is performed in an inert atmosphere as much as possible.

The heteropolyacid and/or heteropolyacid compound in the electrolytic solution undergo electrolysis in response to initial charging or preliminary charging according to the amounts of heteropolyacid and/or heteropolyacid compound added, and as a result compounds that originate from the heteropolyacid and/or heteropolyacid compound deposit on the surface of the positive electrode 33 and form an inorganic coating. The coating formed on the positive electrode 33 is sufficient to suppress the oxidative activity on the surface of the positive electrode 33. As with the coating formed on the negative electrode 34, the polyacid and/or polyacid compound that deposit on the surface of the positive electrode 33 are amorphous, and exist on the surface of the positive electrode 33 as, for example, a gelled positive electrode coating formed by absorbing the nonaqueous electrolyte. The presence or absence of the inorganic coating that originates from the heteropolyacid and/or heteropolyacid compound can be confirmed by checking the positive electrode 33 removed by disassembling the nonaqueous electrolyte battery after charging or preliminary charging.

Because the electrolytic solution of the heteropolyacid and/or heteropolyacid compound dissolved therein impregnates the negative electrode active material layer 34B, the compounds that originate from the heteropolyacid and/or heteropolyacid compound may deposit in the negative electrode active material layer 34B in response to charging or preliminary charging. The compounds that originate from the heteropolyacid and/or heteropolyacid compound may thus exist between negative electrode active material particles.

Similarly, because the electrolytic solution of the heteropolyacid and/or heteropolyacid compound dissolved therein impregnates the positive electrode active material layer 33B, the compounds that originate from the heteropolyacid and/or heteropolyacid compound may deposit in the positive electrode active material layer 33B in response to charging or preliminary charging. The compounds that originate from the heteropolyacid and/or heteropolyacid compound may thus exist between positive electrode active material particles.

In the nonaqueous electrolyte battery, the inorganic coating that originates from the polyacid and/or polyacid compound, and the coating that originates from the halogenated or unsaturated cyclic carbonates of Formulae (1) to (3) are formed on the positive electrode 33 and on the negative electrode 34 in response to charging or preliminary charging. The coating that originates from the halogenated or unsaturated cyclic carbonates of Formulae (1) to (3) serves as a protective coating that suppresses the degradation of charge and discharge cycle characteristics caused by decomposition of the solvent. The inorganic coating that originates from the polyacid and/or polyacid compound suppresses gas production that results from oxidation or reduction of the organic compounds such as the halogenated or unsaturated cyclic carbonates of Formulae (1) to (3). The compounds that originate from the polyacid and/or polyacid compound and deposit in response to initial charging or preliminary charging absorb gas themselves. In this way, gas production during high-temperature storage can be suppressed, or the generated gas can be absorbed, while suppressing degradation of charge and discharge cycle characteristics at the same time.

The effect of coating becomes particularly prominent at high charge voltages of, for example, 4.3 V and higher, when the positive electrode 33 has a coating that originate from chloroethylene carbonate (CEC; halogenated cyclic carbonate), and a coating that includes the polyacid and/or polyacid compound.

In batteries with the charge voltage of, for example, 4.2 V or less, gas production under high-temperature storage conditions can be suppressed with the polyacid and/or polyacid compound, or the heteropolyacid and/or heteropolyacid compound contained in the battery. However, at battery charge voltages of 4.3 V and higher, it is difficult to suppress gas production under high-temperature storage conditions even with the polyacid and/or polyacid compound, or the heteropolyacid and/or heteropolyacid compound contained in the battery.

In this embodiment, the halogenated cyclic carbonate chloroethylene carbonate (CEC) is contained in the battery together with the polyacid and/or polyacid compound, or with the heteropolyacid and/or heteropolyacid compound, when a positive electrode active material of a layered rock-salt crystal structure represented by the following chemical formula 1 is used.

$$Li_xMO_2 \hspace{4em} \text{Chemical Formula 1}$$

(In the formula, M is at least one element selected from cobalt (Co), nickel (Ni), aluminum (Al), manganese (Mn), boron (B), magnesium (Mg), silicon (Si), phosphorus (P), sulfur (S), titanium (Ti), chromium (Cr), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb), and antimony (Sb). In the fully charged state, $x \leq 0.45$.)

The chloroethylene carbonate (CEC) forms a lithium chloride coating on the positive electrode surface. The polyacid and/or polyacid compound, or the heteropolyacid and/or heteropolyacid compound forms a molybdenum oxide coating or a tungsten oxide coating on the positive electrode surface. With these two different positive electrode coatings, the reaction between the positive electrode active material and the nonaqueous electrolytic solution can be suppressed even at the battery charge voltage of 4.3 V or higher.

Battery swelling caused by gas production during high-temperature storage can be further suppressed by coating the positive electrode active material with phosphates such as lithium phosphate, and lithium iron phosphate, because the phosphate suppresses the nonaqueous electrolytic solution from contacting the positive electrode active material, and allows for conduction of only lithium ions.

(Polymer Compounds)

Materials that gel by absorbing the electrolytic solution can be used as the polymer compounds. The polymer compounds may be used alone or as a mixture of two or more, or may be copolymers of two or more compounds. Specific examples include polyvinyl formal of Formula (9), polyacrylic acid ester of Formula (10), polyvinylidene fluoride of Formula (11), and a copolymer of vinylidene fluoride and hexafluoropropylene.

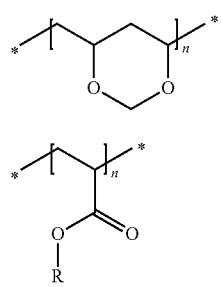

(9)

(10)

(R is a $C_aH_{2a-1}O_m$ group, $1 \leq a \leq 8$, and $0 \leq m \leq 4$.)

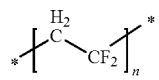

(11)

(R is a $C_aH_{2a-1}O_m$ group, $1 \leq a \leq 8$, and $0 \leq m \leq 4$.)

(Battery Producing Method)

The nonaqueous electrolyte battery is produced using, for example, three producing methods (first to third producing methods), as follows.

(First Producing Method)

(Production of Positive Electrode)

The fabrication begins with the positive electrode 33. For example, the positive electrode material, the binder, and the conductive agent are mixed to obtain a positive electrode mixture, which is then dispersed in an organic solvent, and formed into a paste positive electrode mixture slurry. The positive electrode mixture slurry is then evenly coated over the both surfaces of the positive electrode collector 33A using, for example, a doctor blade or a bar coater. After drying, the coating is compression molded using, for example, a roller press machine under optionally applied heat, and the positive electrode active material layer 33B is formed. The compression molding may be repeated multiple times.

(Production of Negative Electrode)

The negative electrode 34 is fabricated next. For example, the negative electrode material, the binder, and, optionally, the conductive agent are mixed to obtain a negative electrode mixture, which is then dispersed in an organic solvent, and formed into a paste negative electrode mixture slurry. The negative electrode mixture slurry is evenly coated over the both surfaces of the negative electrode collector 34A using, for example, a doctor blade or a bar coater. After drying, the coating is compression molded using, for example, a roller press machine under optionally applied heat, and the negative electrode active material layer 34B is formed.

A separately prepared precursor solution containing the electrolytic solution, the polymer compound, and the solvent is coated over the positive electrode 33 and the negative electrode 34, and the solvent is evaporated to form the gel electrolyte 36. The polyacid and/or polyacid compound are added during the preparation of the electrolytic solution. Then, the positive electrode lead 31 and the negative electrode lead 32 are attached to the positive electrode collector 33A and the negative electrode collector 34A, respectively.

The positive electrode 33 and the negative electrode 34 with the electrolyte 36 are then laminated via the separator 35, and wound along the longitudinal direction. The protective tape 37 is then bonded to the outermost periphery to fabricate the wound electrode unit 30. Finally, the wound electrode unit 30 is placed between, for example, a pair of film-like exterior members 40, and sealed therein by bonding the exterior members 40 at the peripheries by, for example, heatfusion. The adhesive film 41 is inserted between the positive and negative electrode leads 31 and 32 and the exterior members 40. This completes the nonaqueous electrolyte battery shown in FIGS. 1 and 2.

(Second Producing Method)

The positive electrode 33 and the negative electrode 34 are fabricated as in the first producing method. The positive electrode lead 31 and the negative electrode lead 32 are then attached to the positive electrode 33 and the negative electrode 34, respectively. The positive electrode 33 and the negative electrode 34 are then laminated and wound around with the separator 35 in between, and the protective tape 37 is bonded to the outermost periphery to obtain a wound unit as a precursor of the wound electrode unit 30.

The wound unit is then placed between a pair of film-like exterior members 40, which are then bonded by, for example, heatfusion at the peripheries, leaving one side open. As a result, the wound unit is housed inside the bag of the exterior member 40. Then, an electrolyte composition is prepared that includes the electrolytic solution, the raw material monomer of the polymer compound, a polymerization initiator, and optional materials such as a polymerization inhibitor, and the electrolyte composition is injected into the bag of the exterior member 40. The opening of the exterior member 40 is then sealed by, for example, heatfusion. The polyacid and/or polyacid compound are added during the preparation of the electrolytic solution. Finally, the monomer is heat polymerized into the polymer compound, and the gel electrolyte 36 is formed. This completes the nonaqueous electrolyte battery shown in FIGS. 1 and 2.

(Third Producing Method)

In the third producing method, a wound unit is formed and housed in the bag of the exterior member 40 in the same manner as in the second producing method, except that the polymer compound is coated on the both sides of the separator 35 in advance.

The polymer compound coated on the separator 35 may be, for example, a polymer that includes a vinylidene fluoride component, specifically, a homopolymer, a copolymer, or a multicomponent copolymer. Specific examples include polyvinylidene fluoride, binary copolymers that include vinylidene fluoride and hexafluoropropylene components, and ternary copolymers that include vinylidene fluoride, hexafluoropropylene, and chlorotrifluoroethylene components.

Note that the polymer compound may include one or more other polymer compounds, in addition to the polymer that includes a vinylidene fluoride component. Then, the electrolytic solution is prepared, and injected into the exterior member 40, and the opening of the exterior member 40 is sealed by, for example, heatfusion. The polyacid and/or polyacid compound are added during the preparation of the electrolytic solution. Finally, the exterior member 40 is heated under applied load to contact the separator 35 with the positive electrode 33 and the negative electrode 34 via the polymer compound. As a result, the electrolytic solution impregnates the polymer compound, causing the polymer compound to gel and form the electrolyte 36. This completes the nonaqueous electrolyte battery shown in FIGS. 1 and 2.

The nonaqueous electrolyte battery is, for example, a chargeable and dischargeable nonaqueous electrolyte secondary battery. For example, upon charging, the positive electrode 33 releases lithium ions, and the lithium ions are stored in the negative electrode 34 via the electrolyte 36. Upon discharge, the negative electrode 34 releases lithium ions, and the lithium ions are stored in the positive electrode 33 via the electrolyte 36. Alternatively, for example, the lithium ions in the electrolyte 36 accept electrons upon charging, and deposit as lithium metal on the negative electrode 34. Upon discharge, the lithium metal on the negative electrode 34 releases electrons, which then dissolve in the electrolyte 36 in the form of lithium ions. Further, for example, the positive electrode 33 releases lithium ions upon charging, and the lithium ions are stored in the negative electrode 34 via the electrolyte 36 as the lithium metal deposits in the process of charging. Upon discharge, the lithium metal deposited on the negative electrode 34 releases electrons, which then dissolve in the electrolyte 36 in the form of lithium ions, and the lithium ions stored in the negative electrode 34 are released in the process of discharge, and stored in the positive electrode 33 via the electrolyte 36.

(Variations)

In the exemplary configuration of the nonaqueous electrolyte battery described above, the polyacid and/or polyacid compound were added to the electrolytic solution in advance. However, the polyacid and/or polyacid compound may be added in advance to the constituting elements of the battery other than the electrolytic solution.

The first to third variations below describe exemplary configurations of the nonaqueous electrolyte battery in which the polyacid and/or polyacid compound are added in advance to the constituting elements of the battery other than the electrolytic solution. Note that the following descriptions primarily deal with differences from the foregoing exemplary configuration of the nonaqueous electrolyte battery (the polyacid and/or polyacid compound being added in advance to the electrolytic solution), and descriptions concerning the foregoing exemplary configuration of the nonaqueous electrolyte battery will be omitted as appropriate.

(First Variation: Polyacid and/or Polyacid Compound Added to Positive Electrode Active Material Layer)

The first variation does not differ from the foregoing exemplary configuration of the nonaqueous electrolyte battery, except that the polyacid and/or polyacid compound are added in advance not to the electrolytic solution but to the positive electrode active material layer.

(Method of Production of Positive Electrode 33)

In the first variation, the positive electrode 33 is fabricated in the following manner. First, the positive electrode material, the binder, and the conductive agent are mixed, and the polyacid and/or polyacid compound are dissolved in an organic solvent such as N-methyl-2-pyrrolidone to prepare a solution. The solution is mixed with the mixture of the positive electrode material, the binder, and the conductive agent to prepare a positive electrode mixture, which is then dispersed in an organic solvent such as N-methyl-2-pyrrolidone to obtain a positive electrode mixture slurry. The positive electrode mixture slurry is evenly coated over the both surfaces of the positive electrode collector 33A using, for example, a doctor blade or a bar coater. After drying, the coating is compression molded using, for example, a roller press machine under optionally applied heat, and the positive electrode active material layer 33B is formed.

(Positive Electrode Active Material Layer 33B)

In the first variation, prior to charging and discharge, the positive electrode active material layer 33B includes the polyacid and/or polyacid compound, and one or more positive electrode materials (positive electrode active materials) capable of storing and releasing lithium. As required, the positive electrode active material layer 33B may also include other materials such as a binder and a conductive agent.

(Behaviors of Polyacid and/or Polyacid Compound and Halogenated or Unsaturated Cyclic Carbonates in Response to Charging)

The electrolytic solution impregnates the positive electrode active material layer 33B, and thus the polyacid and/or polyacid compound contained in the positive electrode active material layer 33B dissolve into the electrolytic solution. In response to initial charging or preliminary charging, a coating that originates from the polyacid and/or polyacid compound dissolved into the electrolytic solution, and a coating that originates from the halogenated or unsaturated cyclic carbonates of Formulae (1) to (3) are formed on the negative electrode 34.

Specifically, as a result of initial charging or preliminary charging, the polyacid and/or polyacid compound dissolved in the electrolytic solution undergo electrolysis, and compounds that originate from the polyacid and/or polyacid compound deposit on the surface of the negative electrode 34 and form an inorganic coating. Further, in response to charging, the halogenated or unsaturated cyclic carbonates of Formulae (1) to (3) undergo a reductive decomposition reaction, and a coating that originates from the halogenated or unsaturated cyclic carbonates of Formulae (1) to (3) is formed on the negative electrode 34.

Further, as a result of initial charging or preliminary charging, the polyacid and/or polyacid compound dissolved in the electrolytic solution undergo electrolysis, and compounds that originate from the polyacid and/or polyacid compound deposit on the surface of the positive electrode 33 and form an inorganic coating.

Because the polyacid and/or polyacid compound dissolve into the electrolytic solution that impregnates the negative electrode active material layer 34B, compounds that originate from the polyacid and/or polyacid compound may deposit in the negative electrode active material layer 34B in response to charging or preliminary charging. The compounds that originate from the polyacid and/or polyacid compound may thus exist between negative electrode active material particles.

Further, because the polyacid and/or polyacid compound dissolve into the electrolytic solution that impregnates the positive electrode active material layer 33B, compounds that originate from the polyacid and/or polyacid compound may deposit in the positive electrode active material layer 33B in response to charging or preliminary charging. The compounds that originate from the polyacid and/or polyacid compound may thus exist between the positive electrode active material particles.

(Second Variation: Polyacid and/or Polyacid Compound Added in Advance to Negative Electrode Active Material Layer)

The second variation does not differ from the foregoing exemplary configuration of the nonaqueous electrolyte battery, except that the polyacid and/or polyacid compound are added in advance not to the electrolytic solution but to the negative electrode active material layer 34B.

(Method of Production of Negative Electrode 34)

In the second variation, the negative electrode 34 is fabricated in the following manner. First, the negative electrode material, the binder, and, optionally, the conductive agent are mixed. Separately, the polyacid and/or polyacid compound are dissolved to prepare a solution. The solution is mixed with the mixture to obtain a negative electrode mixture, which is then dispersed in an organic solvent such as N-methyl-2-pyrrolidone to obtain a paste negative electrode mixture slurry. The negative electrode mixture slurry is evenly coated over the both surfaces of the negative electrode collector 34A using, for example, a doctor blade or a bar coater. After drying, the coating is compression molded using, for example, a roller press machine under optionally applied heat, and the negative electrode active material layer 34B is formed.

(Negative Electrode Active Material Layer 34B)

In the second variation, prior to charging and discharge, the negative electrode active material layer 34B includes the polyacid and/or polyacid compound, and one or more negative electrode materials (negative electrode active materials) capable of storing and releasing lithium. Other materials such as a binder and a conductive agent also may be contained, as required.

(Behaviors of Polyacid and/or Polyacid Compound, and Halogenated or Unsaturated Cyclic Carbonates in response to Charging)

The electrolytic solution impregnates the negative electrode active material layer 34B, and thus the polyacid and/or polyacid compound contained in the negative electrode active material layer 34B dissolve into the electrolytic solution. As a result of initial charging or preliminary charging, an inorganic coating that originates from the polyacid and/or polyacid compound dissolved into the electrolytic solution, and a coating that originates from the halogenated or unsaturated cyclic carbonates of Formulae (1) to (3) contained in the electrolytic solution are formed on the negative electrode 34.

Specifically, as a result of initial charging or preliminary charging, the polyacid and/or polyacid compound dissolved in the electrolytic solution undergo electrolysis, and compounds that originate from the polyacid and/or polyacid compound deposit on the surface of the negative electrode 34 and form an inorganic coating. Further, in response to charging, the halogenated or unsaturated cyclic carbonates of Formulae (1) to (3) undergo a reductive decomposition reaction, and a coating that originates from the halogenated or unsaturated cyclic carbonates of Formulae (1) to (3) is formed on the negative electrode 34.

Further, the polyacid and/or polyacid compound dissolved in the electrolytic solution undergo electrolysis in response to initial charging or preliminary charging, according to the amounts of polyacid and/or polyacid compound added. As a result, compounds that originate from the polyacid and/or polyacid compound deposit on the surface of the positive electrode 33, and form an inorganic coating.

Because the polyacid and/or polyacid compound dissolve into the electrolytic solution that impregnates the negative electrode active material layer 34B, compounds that originate from the polyacid and/or polyacid compound may deposit in the negative electrode active material layer 34B in response to charging or preliminary charging. The compounds that originate from the polyacid and/or polyacid compound may thus exist between negative electrode active material particles.

Further, because the polyacid and/or polyacid compound dissolve into the electrolytic solution that impregnates the positive electrode active material layer 33B, compounds that originate from the polyacid and/or polyacid compound may deposit in the positive electrode active material layer 33B in response to charging or preliminary charging. The compounds that originate from the polyacid and/or polyacid compound may thus exist between positive electrode active material particles.

(Third Variation)

The third variation does not differ from the foregoing exemplary configuration of the nonaqueous electrolyte battery, except that the polyacid and/or polyacid compound are added in advance not to the electrolytic solution but to the separator 35.

In the third variation, the polyacid and/or polyacid compound are added in advance to the separator 35. For example, the polyacid and/or polyacid compound are added in advance to the separator 35 in the following manner.

The separator 35 is dipped in a solution of the polyacid and/or polyacid compound dissolved in a polar organic solvent such as dimethyl carbonate. After being impregnated with the solution, the separator 35 is dried in a vacuum atmosphere. As a result, the polyacid and/or polyacid compound deposit on the surface or in the pores of the separator 35.

(Behaviors of Polyacid and/or Polyacid Compound, and Halogenated or Unsaturated Cyclic Carbonates in Response to Charging)

The separator 35 is impregnated with the electrolytic solution, and thus the polyacid and/or polyacid compound added to the separator 35 dissolve into the electrolytic solution. As a result of initial charging or preliminary charging, an inorganic coating that originates from the polyacid and/or polyacid compound dissolved in the electrolytic solution, and a coating that originates from the halogenated or unsaturated cyclic carbonates of Formulae (1) to (3) contained in the electrolytic solution are formed on the negative electrode 34.

Specifically, as a result of initial charging or preliminary charging, the polyacid and/or polyacid compound dissolved in the electrolytic solution undergo electrolysis, and compounds that originate from the polyacid and/or polyacid compound deposit on the surface of the negative electrode 34 and form an inorganic coating. Further, in response to charging, the halogenated or unsaturated cyclic carbonates of Formulae (1) to (3) undergo a reductive decomposition reaction, and a coating that originates from the halogenated or unsaturated cyclic carbonates of Formulae (1) to (3) is formed on the negative electrode 34.

Further, the polyacid and/or polyacid compound dissolved in the electrolytic solution undergo electrolysis in response to initial charging or preliminary charging, according to the amounts of polyacid and/or polyacid compound added. As a result, compounds that originate from the polyacid and/or polyacid compound deposit on the surface of the positive electrode 33 and form an inorganic coating.

Because the polyacid and/or polyacid compound dissolve into the electrolytic solution that impregnates the negative electrode active material layer 34B, compounds that originate from the polyacid and/or polyacid compound may deposit in the negative electrode active material layer 34B in response to charging or preliminary charging. The compounds that originate from the polyacid and/or polyacid compound may thus exist between negative electrode active material particles.

Further, because the polyacid and/or polyacid compound dissolve into the electrolytic solution that impregnates the positive electrode active material layer 33B, compounds that originate from the polyacid and/or polyacid compound may deposit in the positive electrode active material layer 33B in response to charging or preliminary charging. The compounds that originate from the polyacid and/or polyacid compound may thus exist between positive electrode active material particles.

(Effects)

With the nonaqueous electrolyte battery according to First Embodiment, gas production during high-temperature storage can be suppressed while improving charge and discharge cycle characteristics.

2. Second Embodiment

A nonaqueous electrolyte battery according to Second Embodiment is described below. The nonaqueous electrolyte battery according to Second Embodiment does not differ from the nonaqueous electrolyte battery of First Embodiment, except that the electrolytic solution is directly used instead of being retained in the polymer compound (electrolyte 36). Accordingly, the following detailed descriptions mainly deal with the difference from First Embodiment.

(Configuration of Nonaqueous Electrolyte Battery)

The nonaqueous electrolyte battery according to Second Embodiment uses the electrolytic solution instead of the gel electrolyte 36. Thus, the wound electrode unit 30 does not include the electrolyte 36, and instead includes the electrolytic solution impregnating the separator 35.

(Method of Production of Nonaqueous Electrolyte Battery)

The nonaqueous electrolyte battery can be produced, for example, as follows.

First, for example, the positive electrode active material, the binder, and the conductive agent are mixed to prepare a positive electrode mixture, which is then dispersed in a solvent such as N-methyl-2-pyrrolidone to obtain a positive electrode mixture slurry. The positive electrode mixture slurry coated on the both sides, dried, and compression molded to form the positive electrode active material layer 33B and obtain the positive electrode 33. Thereafter, for example, the positive electrode lead 31 is attached to the positive electrode collector 33A, for example, by ultrasonic welding or spot welding.

For example, the negative electrode material and the binder are mixed to prepare a negative electrode mixture, which is then dispersed in a solvent such as N-methyl-2-pyrrolidone to obtain a negative electrode mixture slurry. The negative electrode mixture slurry is coated on the both sides of the negative electrode collector 34A, dried, and compression molded to form the negative electrode active material layer 34B and obtain the negative electrode 34. Thereafter, for example, the negative electrode lead 32 is attached to the negative electrode collector 34A, for example, by ultrasonic welding or spot welding.

The positive electrode 33 and the negative electrode 34 are wound around with the separator 35 in between, and installed in the exterior member 40. The electrolytic solution is then injected into the exterior member 40, and the exterior member 40 is sealed. As a result, the nonaqueous electrolyte battery shown in FIGS. 1 and 2 is obtained.

Effects

The effects obtained in First Embodiment also can be obtained in Second Embodiment.

3. Third Embodiment (Configuration of Nonaqueous Electrolyte Battery)

Figure 3:
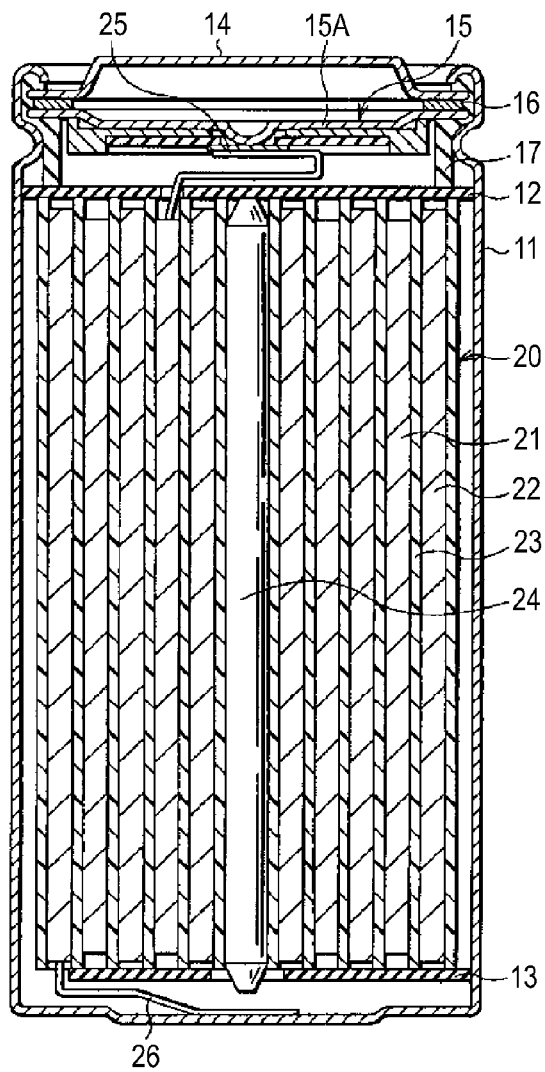
FIG. 3 is a cross sectional view illustrating an exemplary configuration of a nonaqueous electrolyte battery according to an embodiment.

A configuration of a nonaqueous electrolyte battery according to Third Embodiment is described below with reference to FIGS. 3 to 4. FIG. 3 represents an exemplary configuration of the nonaqueous electrolyte battery according to Third Embodiment. The nonaqueous electrolyte battery is of a cylindrical type, in which a wound electrode unit 20 as the laminate of a belt-like positive electrode 21 and a belt-like negative electrode 22 via a separator 23 is placed in a substantially hollow cylindrical battery canister (cylindrical canister) 11 provided as an exterior member. The separator 23 is impregnated with the liquid electrolyte electrolytic solution. The battery canister 11 is made of, for example, nickel (Ni)-plated iron (Fe), and has a closed end and an open end. Inside the battery canister 11, a pair of insulating plates 12 and 13 is disposed on the both sides of the wound electrode unit 20, perpendicularly to the rolled surface.

The battery canister 11 is sealed with a battery lid 14 fastened to the open end of the battery canister 11 by swaging via a gasket 17, together with a safety valve mechanism 15 and a heat-sensitive resistive (PTC; Positive Temperature Coefficient) element 16 provided inside the battery lid 14. The battery lid 14 is formed using, for example, the same or similar materials used for the battery canister 11. The safety valve mechanism 15 is electrically connected to the battery lid 14 via the heat-sensitive resistive element 16, and cuts off the electrical connection between the battery lid 14 and the wound electrode unit 20 by the inversion of a disk plate 15A, when the pressure inside the battery reaches a certain level as a result of internal shorting or external heat. The heat-sensitive resistive element 16 increases its resistance value under elevated temperatures, and restricts current to prevent abnormal heating due to overcurrent. The gasket 17 is formed using, for example, insulating material, and is asphalt-coated.

The wound electrode unit 20 is wound around, for example, a center pin 24. The positive electrode 21 of the wound electrode unit 20 is connected to a positive electrode lead 25 of, for example, aluminum (Al), and the negative electrode 22 is connected to a negative electrode lead 26 of, for example, nickel (Ni). The positive electrode lead 25 is electrically connected to the battery lid 14 by being welded to the safety valve mechanism 15. The negative electrode lead 26 is electrically connected to the battery canister 11 by being welded thereto.

Figure 4:
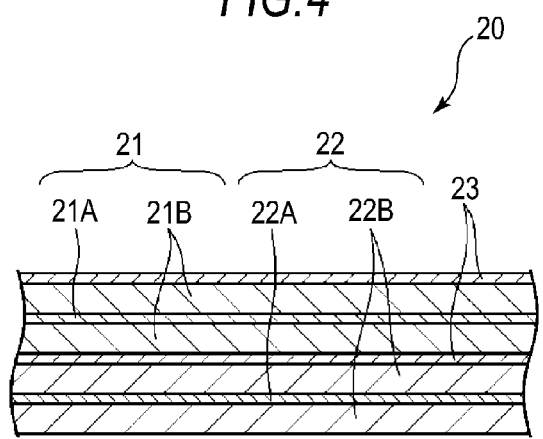
FIG. 4 is an enlarged cross sectional view of a portion of the wound electrode unit.

FIG. 4 is an enlarged cross sectional view illustrating a portion of the wound electrode unit 20 shown in FIG. 3. The wound electrode unit 20 is the wound laminate of the positive electrode 21 and the negative electrode 22 via the separator 23.

The positive electrode 21 includes, for example, a positive electrode collector 21A, and a positive electrode active material layer 21B formed on the both surfaces of the positive electrode collector 21A. The negative electrode 22 includes, for example, a negative electrode collector 22A, and a negative electrode active material layer 22B formed on the both surfaces of the negative electrode collector 22A. The positive electrode collector 21A, the positive electrode active material layer 21B, the negative electrode collector 22A, the negative electrode active material layer 22B, the separator 23, and the electrolytic solution have the same configurations as the positive electrode collector 33A, the positive electrode active material layer 33B, the negative electrode collector 34A, the negative electrode active material layer 34B, the separator 35, and the electrolytic solution, respectively, of First Embodiment.

(Method of Production of Nonaqueous Electrolyte Battery)

The nonaqueous electrolyte battery can be produced as follows.

The positive electrode 21 is fabricated in the same manner as the positive electrode 33 of First Embodiment. The negative electrode 22 is fabricated in the same manner as the negative electrode 34 of First Embodiment.

The positive electrode lead 25 and the negative electrode lead 26 are attached to the positive electrode collector 21A and to the negative electrode collector 22A, respectively, by, for example, welding. The positive electrode 21 and the negative electrode 22 are then wound around via the separator 23, and the positive electrode lead 25 and the negative electrode lead 26 are welded at the front end to the safety valve mechanism 15 and to the battery canister 11, respectively. The roll of the positive electrode 21 and the negative electrode 22 is then sandwiched between the insulating plates 12 and 13, and housed inside the battery canister 11. With the positive electrode 21 and the negative electrode 22 housed inside the battery canister 11, the electrolytic solution is injected into the battery canister 11, and the separator 23 is impregnated with the electrolytic solution. The battery lid 14, the safety valve mechanism 15, and the heat-sensitive resistive element 16 are then fastened to the open end of the battery canister 11 by swaging via the gasket 17. As a result, the nonaqueous electrolyte battery shown in FIG. 3 is obtained.

Effects

The effects obtained in First Embodiment also can be obtained in Third Embodiment.

4. Fourth Embodiment (Configuration of Nonaqueous Electrolyte Battery)

Figure 5:
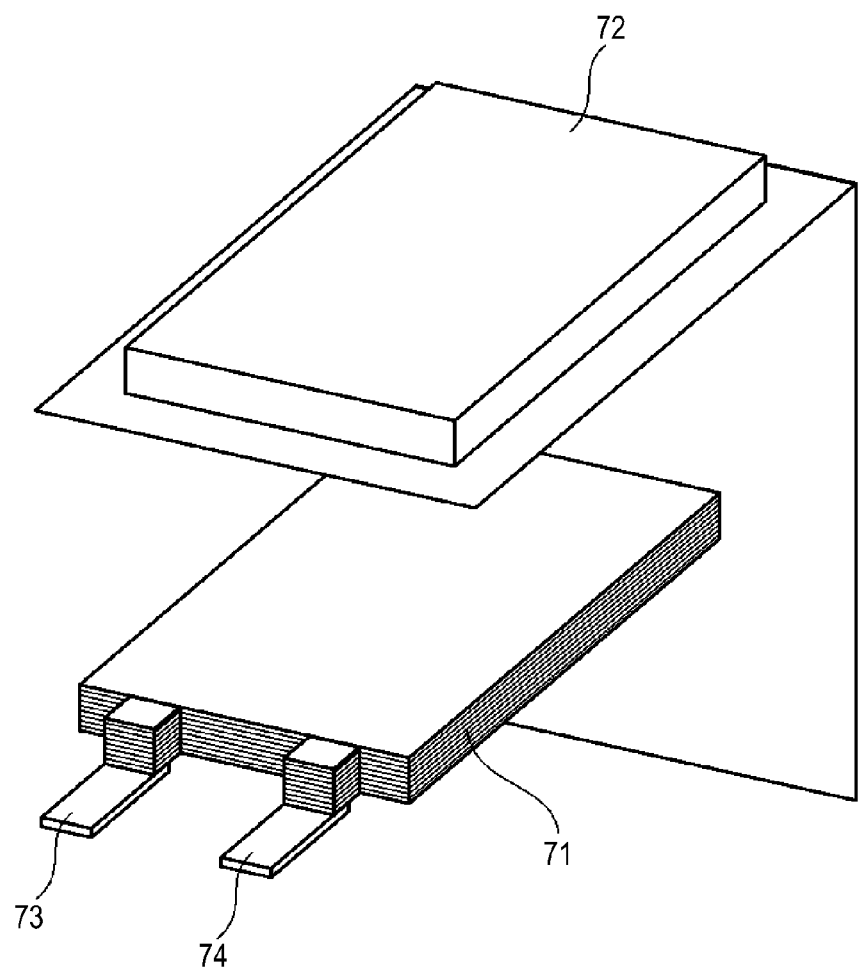
FIG. 5 is an exploded perspective view illustrating an exemplary configuration of a nonaqueous electrolyte battery according to an embodiment.

FIG. 5 is an exploded perspective view representing an exemplary configuration of a nonaqueous electrolyte battery according to Fourth Embodiment. As illustrated in FIG. 5, the nonaqueous electrolyte battery includes a battery element 71 to which a positive electrode lead 73 and a negative electrode lead 74 are attached, and the battery element 71 is housed inside a film-like exterior member 72, in order to make the battery small, lightweight, and thin.

The positive electrode lead 73 and the negative electrode lead 74 are provided to extend out of the exterior member 72, for example, in the same direction.

Figure 6:
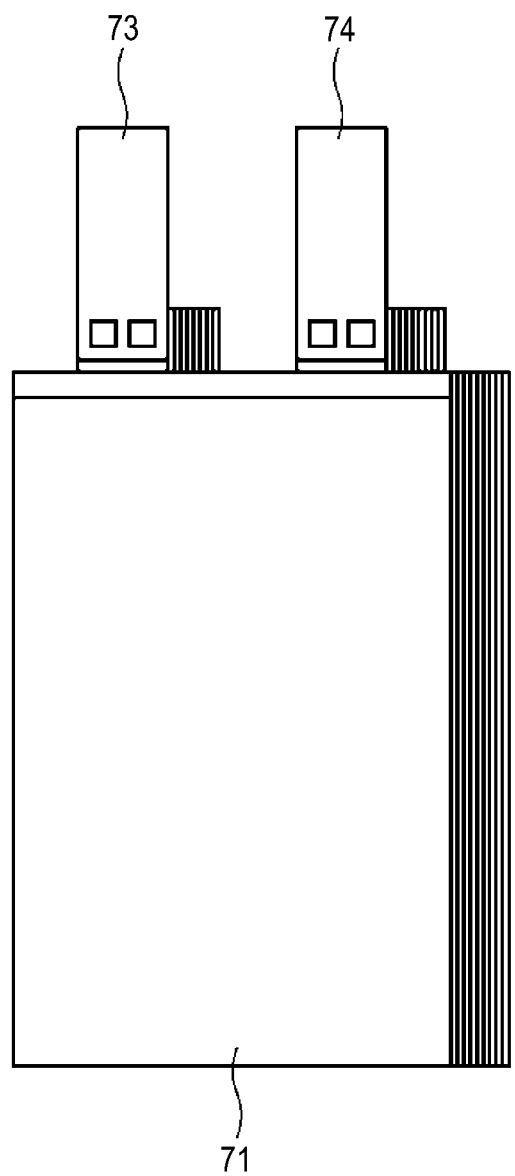
FIG. 6 is a perspective view illustrating an example of an external appearance of a battery element.
Figure 7:
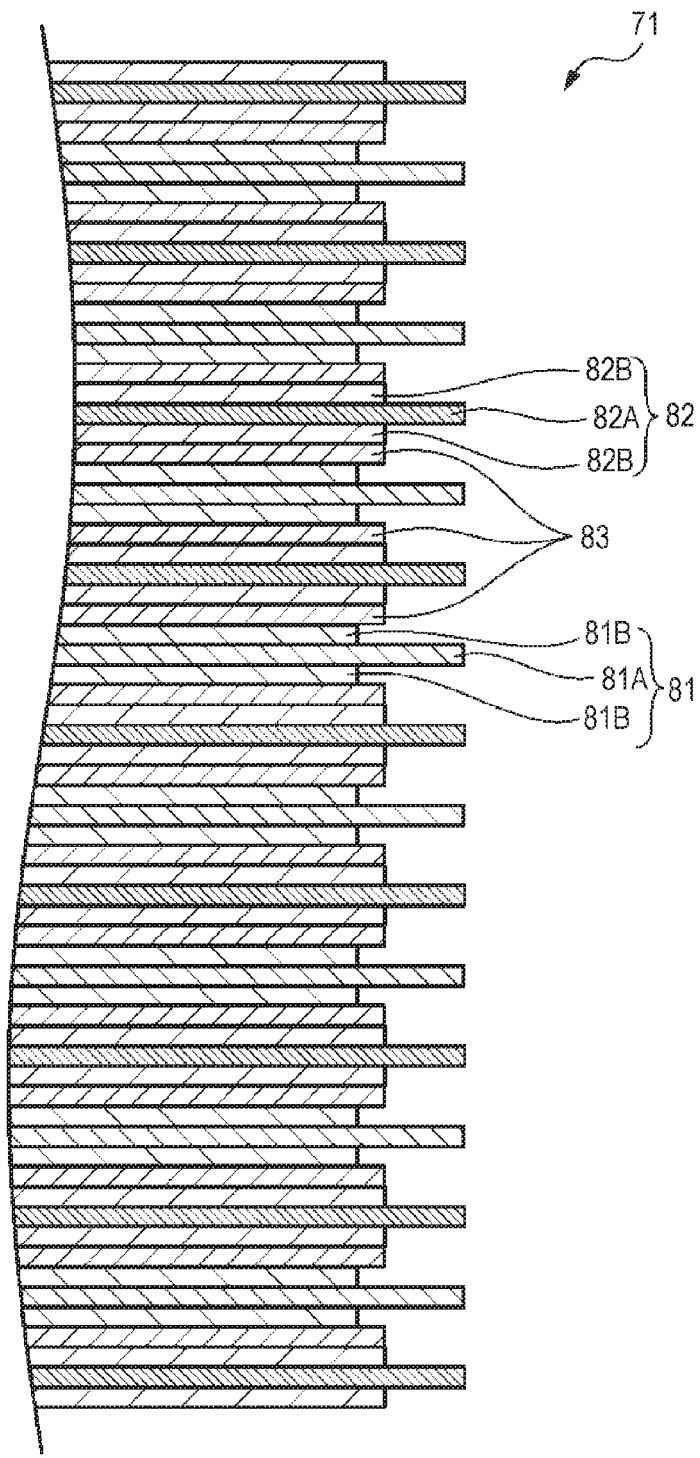
FIG. 7 is a cross sectional view illustrating an exemplary configuration of the battery element.

FIG. 6 is a perspective view illustrating an example of an appearance of the battery element 71. FIG. 7 is a cross sectional view illustrating an exemplary configuration of the battery element 71. As illustrated in FIGS. 6 and 7, the battery element 71 is an electrode laminate that includes a positive electrode 81 and a negative electrode 82 laminated via a separator 83, and the battery element 71 is impregnated with an electrolytic solution.

Figure 8:
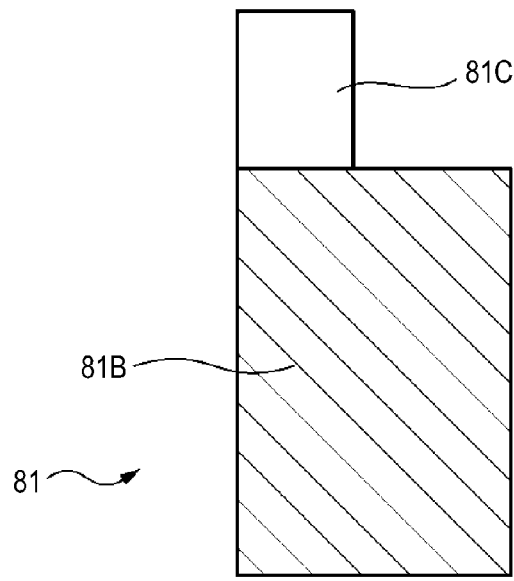
FIG. 8 is a plan view illustrating an exemplary shape of a positive electrode.

The positive electrode 81 is structured to include, for example, a positive electrode active material layer 81B provided on the both sides of a double-sided positive electrode collector 81A. As illustrated in FIG. 8, the positive electrode 81 includes a rectangular electrode portion, and a collector exposed portion 81C that extends from one side of the electrode portion. The collector exposed portion 81C does not include the positive electrode active material layer 81B, and the positive electrode collector 81A is exposed. The collector exposed portion 81C is electrically connected to the positive electrode lead 73. Though not illustrated, a region with the positive electrode active material layer 81B may be provided only on one side of the positive electrode collector 81A.

Figure 9:
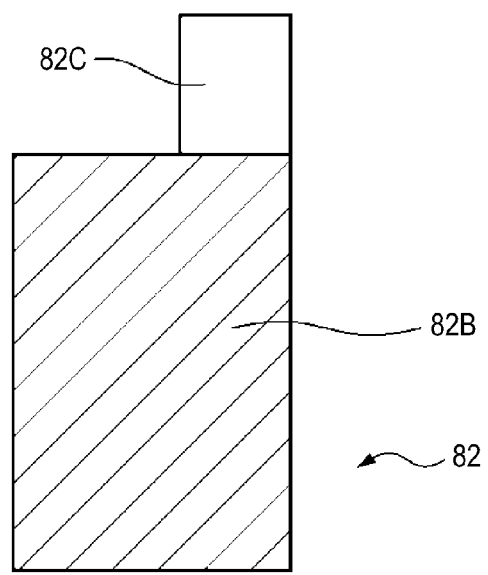
FIG. 9 is a plan view illustrating an exemplary shape of a negative electrode.

The negative electrode 82 is structured to include, for example, a negative electrode active material layer 82B provided on the both sides of a double-sided negative electrode collector 82A. As illustrated in FIG. 9, the negative electrode 82 includes a rectangular electrode portion, and a collector exposed portion 82C that extends from one side of the electrode portion. The collector exposed portion 82C does not include the negative electrode active material layer 82B, and the negative electrode collector 82A is exposed. The collector exposed portion 82C is electrically connected to the negative electrode lead 74. Though not illustrated, a region with the negative electrode active material layer 82B may be provided only on one side of the negative electrode collector 82A.

Figure 10:
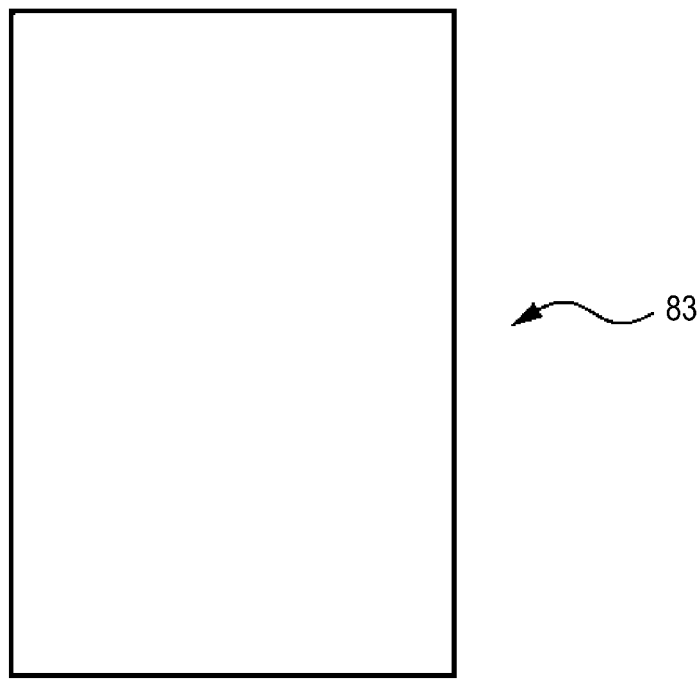
FIG. 10 is a plan view illustrating an exemplary shape of a separator.

As illustrated in FIG. 10, the separator 83 is rectangular in shape, for example.

The positive electrode collector 81A, the positive electrode active material layer 81B, the negative electrode collector 82A, the negative electrode active material layer 82B, the separator 83, and the electrolytic solution are made of the same materials as those used for the positive electrode collector 21A, the positive electrode active material layer 21B, the negative electrode collector 22A, the negative electrode active material layer 22B, the separator 23, and the electrolytic solution, respectively, of First Embodiment.

(Method of Production of Nonaqueous Electrolyte Battery)

The nonaqueous electrolyte battery of the foregoing configuration can be produced as follows.

(Fabrication of Positive Electrode)

The positive electrode 81 is fabricated in the following manner. First, for example, the positive electrode material, the binder, and the conductive agent are mixed to prepare a positive electrode mixture, which is then dispersed in an organic solvent such as N-methylpyrrolidone to obtain a paste positive electrode mixture slurry. The positive electrode mixture slurry is then coated over the both surfaces of the positive electrode collector 81A, dried, and pressed into the positive electrode active material layer 81B. The positive electrode active material layer 81B is cut into the shape shown in, for example, FIG. 8, and the positive electrode 81 is obtained.

(Fabrication of Negative Electrode)

The negative electrode 82 is fabricated in the following manner. First, for example, the negative electrode material, the binder, and the conductive agent are mixed to prepare a negative electrode mixture, which is then dispersed in an organic solvent such as N-methylpyrrolidone to obtain a paste negative electrode mixture slurry. The negative electrode mixture slurry is then coated over the both surfaces of the negative electrode collector 82A, dried, and pressed into the negative electrode active material layer 82B. The negative electrode active material layer 82B is then cut into the shape shown in, for example, FIG. 9, and the negative electrode 82 is obtained.

(Fabrication of Battery Element)

The battery element 71 is fabricated in the following manner. First, for example, a polypropylene microporous film is cut into the shape shown in FIG. 10 to fabricate the separator 83. The sheets of the negative electrode 82, the positive electrode 81, and the separator 83 obtained as above are then laminated as illustrated in, for example, FIG. 11, in repeating units of the negative electrode 82, the separator 83, and the positive electrode 81. As a result, the battery element 71 is obtained.

Then, the collector exposed portion 82C of the positive electrode 81 is welded to the positive electrode lead 73. Similarly, the collector exposed portion 82C of the negative electrode 82 is welded to the negative electrode lead 74. The electrolytic solution is then impregnated in the battery element 71, and the battery element 71 is installed in the exterior member 72, which is then sealed at the peripheries by, for example, heat fusion. Here, the positive electrode lead 73 and the negative electrode lead 74 stick out of the exterior member 72 through the heatfused portion, and serve as the positive and negative electrode terminals, respectively. As a result, the nonaqueous electrolyte battery is obtained.

Effects

The effects obtained in First Embodiment also can be obtained in Fourth Embodiment.

5. Fifth Embodiment

Fifth Embodiment is described below. The nonaqueous electrolyte battery according to Fifth Embodiment has the same configuration as the nonaqueous electrolyte battery of Fourth Embodiment, except that a gel electrolyte layer is used instead of the electrolytic solution. Note that elements already described in Fourth Embodiment are given the same reference numerals, and explanations thereof are omitted.

(Structure of Nonaqueous Electrolyte Battery)

Figure 11:
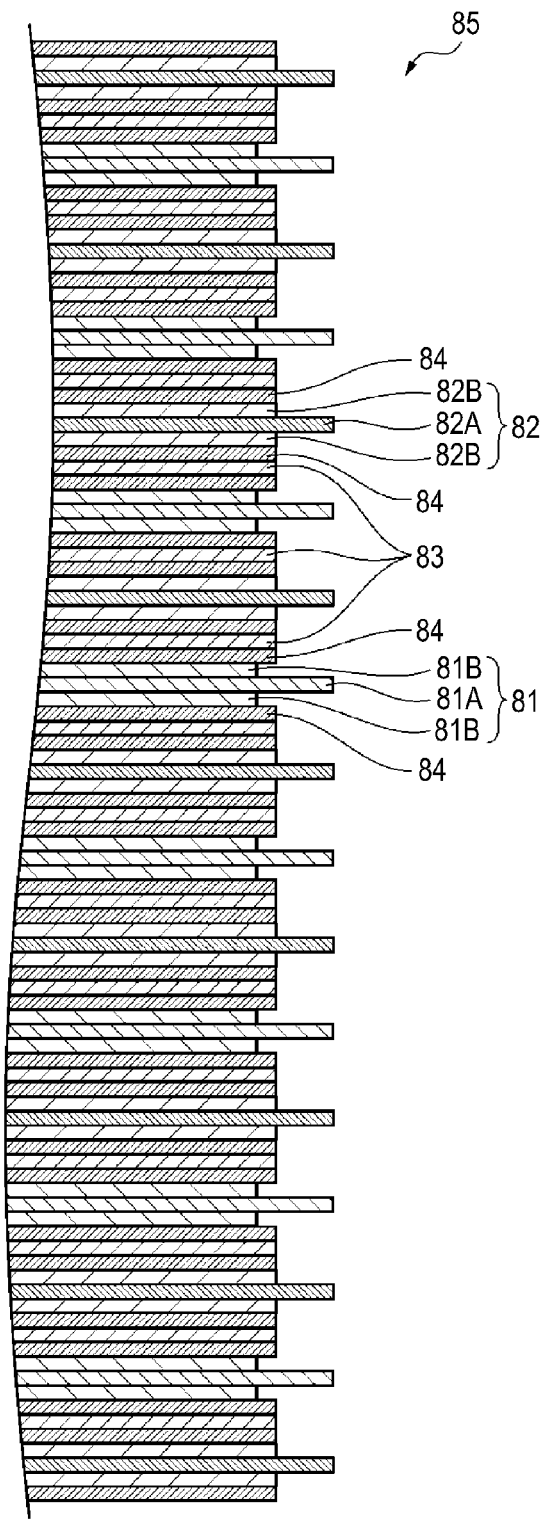
FIG. 11 is a cross sectional view illustrating an exemplary configuration of a battery element used in a nonaqueous electrolyte battery according to an embodiment.

FIG. 11 is a cross sectional view illustrating an exemplary configuration of the battery element used for the nonaqueous electrolyte secondary battery of Fifth Embodiment. A battery element 85 includes the positive electrode 81 and the negative electrode 82 laminated via the separator 83 and an electrolyte layer 84.

The electrolyte layer 84 is a gel layer that includes an electrolytic solution, and a polymer compound provided as a body that retains the electrolytic solution. The gel electrolyte layer 84 is preferred because it can provide high ion conductivity and prevent battery leakage. The polymer compound has the same configuration as described in conjunction with the nonaqueous electrolyte battery of First Embodiment.

(Method of Production of Nonaqueous Electrolyte Battery)

The nonaqueous electrolyte battery of the foregoing configuration can be produced, for example, as follows.

First, the positive electrode 81 and the negative electrode 82 are each coated with a precursor solution that includes a solvent, an electrolyte salt, a polymer compound, and a mixed solvent. The mixed solvent is then evaporated to form the electrolyte layer 84. The nonaqueous electrolyte battery can then be obtained by following the steps described in Fourth Embodiment, except for using the positive electrode 81 and the negative electrode 82 provided with the electrolyte layer 84.

Effects

The effects obtained in Fourth Embodiment also can be obtained in Fifth Embodiment.

EXAMPLES

The following specifically describes the application based on Examples. Note, however, that the application is not limited by the following Examples.

Example 1

Example 1-1

First, 94 parts by mass of the positive electrode active material lithium-nickel-cobalt-aluminum composite oxide (LiNi0.77Co0.20Al0.03O2), 3 parts by mass of the conductive agent graphite, and 3 parts by mass of the binder polyvinylidene fluoride (PVdF) were uniformly mixed, and N-methylpyrrolidone was added to obtain a positive electrode mixture coating solution. The positive electrode mixture coating solution so obtained was then evenly coated over the both surfaces of a 20 μm-thick aluminum foil, and dried to form a positive electrode active material layer in a thickness of 40 μm on each side. The product was cut into a 30-mm width and a 550-mm length to obtain a positive electrode.

Then, 97 parts by mass of the negative electrode active material graphite, and 3 parts by mass of the binder PVdF were uniformly mixed, and N-methylpyrrolidone was added to obtain a negative electrode mixture coating solution. The negative electrode mixture coating solution so obtained was then evenly coated over the both surfaces of a 15 μm-thick copper foil (negative electrode collector), and dried to form a negative electrode active material layer in a thickness of 40 μm on each side. The product was cut into a 30-mm width, and a 550-mm length to obtain a negative electrode.

The electrolytic solution was prepared by mixing ethylene carbonate (25%), diethyl carbonate (58.2%), fluoroethylene carbonate (FEC; 1%), lithium hexafluorophosphate (14.3%), and silicotungstic acid ($H_4SiW_{12}O_{40}$; 1.5%). The proportion in parenthesis is a mass ratio.

The positive electrode and the negative electrode were laminated via a separator formed as a 12 μm-tick microporous polyethylene film. The laminate was wound, and placed in a bag of an aluminum laminate film. After injecting 2 g of an electrolytic solution, the bag was heatfused to obtain a laminated battery. The battery had a capacity of 750 mAh.

Example 1-2

The laminated battery of Example 1-2 was fabricated in the same manner as in Example 1-1, except that a lithium-nickel-cobalt-aluminum composite oxide ($LiNi_{0.77}Co_{0.20}Al_{0.03}O_2$) coated with lithium phosphate (phosphate) was used as the positive electrode active material. The lithium phosphate-coated lithium-nickel-cobalt-aluminum composite oxide was obtained by mixing lithium phosphate with the lithium-nickel-cobalt-aluminum composite oxide using a ball milling machine.

Example 1-3

The laminated battery of Example 1-3 was fabricated in the same manner as in Example 1-2, except that the electrolytic solution was prepared by mixing 0.5 mass % of lithium tetrafluoroborate as a boron-containing lithium salt, and that the amount of lithium hexafluorophosphate was reduced to compensate for the addition of the 0.5 mass % lithium tetrafluoroborate.

Example 1-4

The laminated battery of Example 1-4 was fabricated in the same manner as in Example 1-3, except that the electrolytic solution was prepared using diethyl carbonate in an increased amount to compensate for the reduced amount 0.5 mass % of the silicotungstic acid ($H_4SiW_{12}O_{40}$) in the mixture.

Example 1-5

The laminated battery of Example 1-5 was fabricated in the same manner as in Example 1-3, except that the electrolytic solution was prepared using diethyl carbonate in a reduced amount to compensate for the increased amount 5 mass % of the silicotungstic acid ($H_4SiW_{12}O_{40}$) in the mixture.

Example 1-6

The laminated battery of Example 1-6 was fabricated in the same manner as in Example 1-3, except that the electrolytic solution was prepared using diethyl carbonate in a reduced amount to compensate for the increased amount 6 mass % of the silicotungstic acid ($H_4SiW_{12}O_{40}$) in the mixture.

Example 1-7

The laminated battery of Example 1-7 was fabricated in the same manner as in Example 1-3, except that the electrolytic solution was prepared by mixing phosphotungstic acid ($H_3PW_{12}O_{40}$) instead of silicotungstic acid ($H_4SiW_{12}O_{40}$).

Example 1-8

The laminated battery of Example 1-8 was fabricated in the same manner as in Example 1-3, except that the electrolytic solution was prepared by mixing silicomolybdic acid ($H_4SiMo_{12}O_{40}$) instead of silicotungstic acid ($H_4SiW_{12}O_{40}$).

Example 1-9

The laminated battery of Example 1-9 was fabricated in the same manner as in Example 1-3, except that the electrolytic solution was prepared by mixing phosphomolybdic acid ($H_3PMo_{12}O_{40}$) instead of silicotungstic acid ($H_4SiW_{12}O_{40}$).

Example 1-10

The laminated battery of Example 1-10 was fabricated in the same manner as in Example 1-3, except that the electrolytic solution was prepared by mixing phosphovanadomolybdic acid ($H_4PMo_{11}VO_{40}$) instead of silicotungstic acid ($H_4SiW_{12}O_{40}$).

Example 1-11

The laminated battery of Example 1-11 was fabricated in the same manner as in Example 1-3, except that the electrolytic solution was prepared by mixing lithium silicotungstate ($Li_4SiW_{12}O_{40}$) instead of silicotungstic acid ($H_4SiW_{12}O_{40}$).

Example 1-12

The laminated battery of Example 1-12 was fabricated in the same manner as in Example 1-3, except that the electrolytic solution was prepared by mixing difluoroethylene carbonate (DFEC) instead of fluoroethylene carbonate (FEC).

Example 1-13

The laminated battery of Example 1-13 was fabricated in the same manner as in Example 1-3, except that the electrolytic solution was prepared by mixing 0.5 mass % of fluoroethylene carbonate (FEC) and 0.5 mass % of chloroethylene carbonate (CEC).

Example 1-14

The laminated battery of Example 1-14 was fabricated in the same manner as in Example 1-3, except that the electrolytic solution was prepared by mixing vinylene carbonate (VC) instead of fluoroethylene carbonate (FEC).

Example 1-15

The laminated battery of Example 1-15 was fabricated in the same manner as in Example 1-3, except that the electrolytic solution was prepared by mixing vinyl ethylene carbonate (VEC) instead of fluoroethylene carbonate (FEC).

Example 1-16

The laminated battery of Example 1-16 was fabricated in the same manner as in Example 1-3, except that a lithium-nickel-cobalt-aluminum composite oxide ($LiNi_{0.77}Co_{0.20}Al_{0.03}O_2$) coated with lithium iron phosphate ($LiFePO_4$; phosphate) was used as the positive electrode active material. The lithium iron phosphate ($LiFePO_4$)-coated lithium-nickel-cobalt-aluminum composite oxide was obtained by mixing lithium iron phosphate ($LiFePO_4$) with the lithium-nickel-cobalt-aluminum composite oxide using a ball milling machine.

Example 1-17

The laminated battery of Example 1-17 was fabricated in the same manner as in Example 1-3, except that the electrolytic solution was prepared by mixing 0.4 mass % of $LiBF_4$, and 0.1 mass % of $LiB(C_2O_4)_2$.

Example 1-18

The laminated battery of Example 1-18 was fabricated in the same manner as in Example 1-3, except that a positive electrode active material layer having a thickness of 80 μm on each side was formed during the fabrication of the positive electrode, and that the electrolytic solution was prepared by mixing ethylene carbonate in a reduced amount to compensate for the increased amount 5 mass % of the fluoroethylene carbonate (FEC) in the mixture.

Example 1-19

The laminated battery of Example 1-19 was fabricated in the same manner as in Example 1-3, except that a lithium-cobalt-aluminum composite oxide ($LiCo_{0.99}Al_{0.01}O_2$) was used as the positive electrode active material. The battery had a capacity of 700 mAh.

Comparative Example 1-1

The laminated battery of Comparative Example 1-1 was fabricated in the same manner as in Example 1-3, except that the electrolytic solution was prepared using diethyl carbonate in an increased amount to compensate for the absence of a heteropolyacid compound in the mixture.

Comparative Example 1-2

The laminated battery of Comparative Example 1-2 was fabricated in the same manner as in Example 1-14, except that the electrolytic solution was prepared using diethyl carbonate in an increased amount to compensate for the absence of a heteropolyacid compound in the mixture.

Comparative Example 1-3

The laminated battery of Comparative Example 1-3 was fabricated in the same manner as in Example 1-3, except that the electrolytic solution was prepared using ethylene carbonate in an increased amount to compensate for the absence of fluoroethylene carbonate (FEC) in the mixture.

Comparative Example 1-4

The laminated battery of Comparative Example 1-4 was fabricated in the same manner as in Comparative Example 1-3, except that a positive electrode active material layer having a thickness of 35 μm on each side was formed during the fabrication of the positive electrode. The battery had a capacity of 650 mAh.

Comparative Example 1-5

The laminated battery of Comparative Example 1-5 was fabricated in the same manner as in Example 1-18, except that the electrolytic solution was prepared using ethylene carbonate in an increased amount to compensate for the absence of fluoroethylene carbonate (FEC) in the mixture.

Comparative Example 1-6

The laminated battery of Comparative Example 1-6 was fabricated in the same manner as in Example 1-19, except that the electrolytic solution was prepared using diethyl carbonate in an increased amount to compensate for the absence of a heteropolyacid compound in the mixture.

(Secondary Battery Evaluation: ToF-SIMS Surface Analysis)

Each laminated battery of Examples was charged to a battery voltage of 4.2 V under 750-mA constant current in a 23° C. environment, followed by constant voltage charging to a current value of 37.5 mA under 4.2-V constant voltage. The battery was then discharged at 750 mA to a battery voltage of 3.0 V, and disassembled in an inert atmosphere. The removed negative electrode was washed with dimethyl carbonate for 30 seconds. The negative electrode was subjected to surface analysis by ToF-SIMS (Time of Flight Secondary Ion Mass Spectroscopy) to investigate the presence or absence of polyacids or polyacid compounds originating from the heteropolyacid added, and the presence or absence of components originating from fluoroethylene carbonate (FEC).

Figure 12:
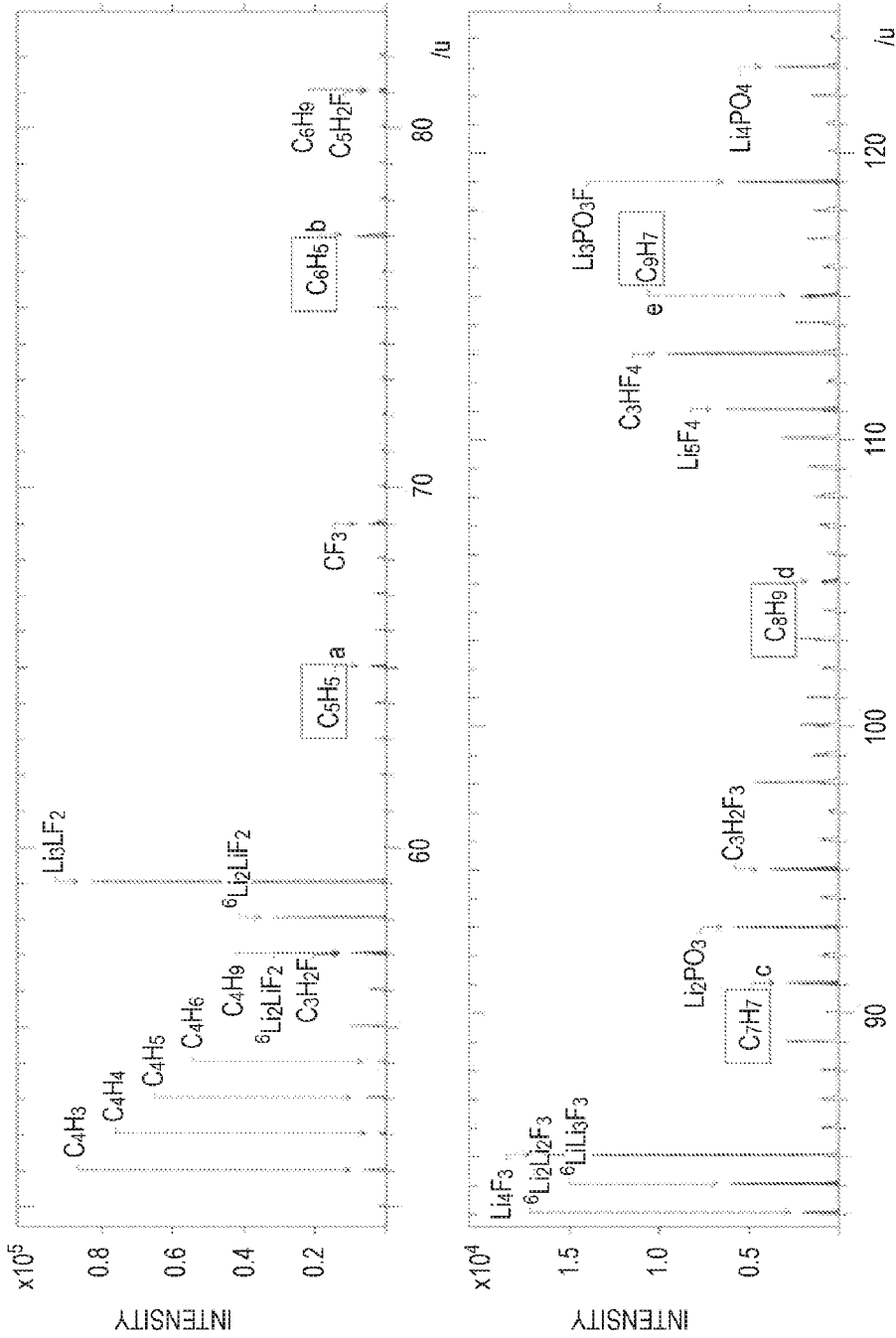
FIG. 12 is a graph representing the result of TOF-SIMS analysis.
Figure 13:
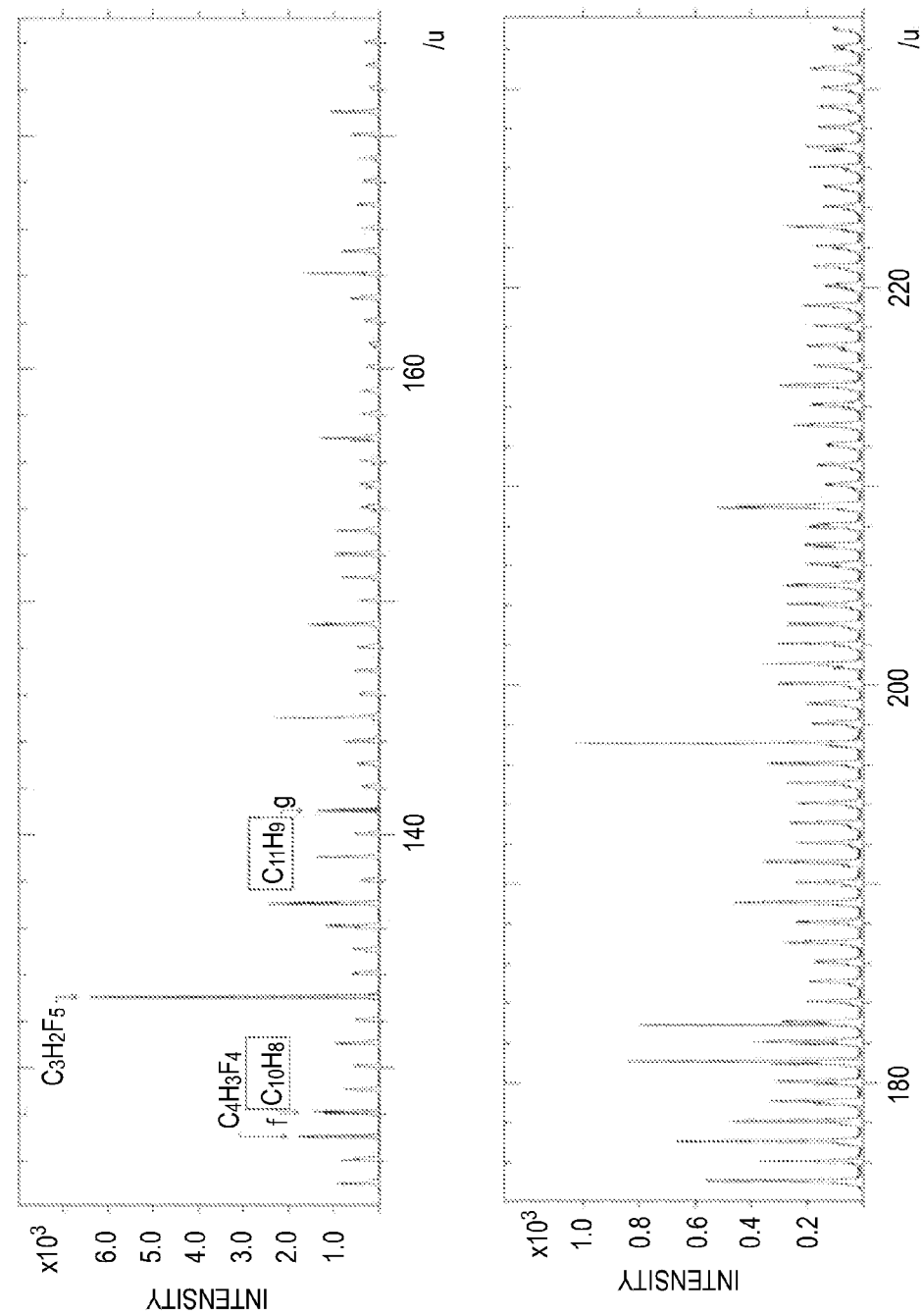
FIG. 13 is a graph representing the result of TOF-SIMS analysis.
Figure 14:
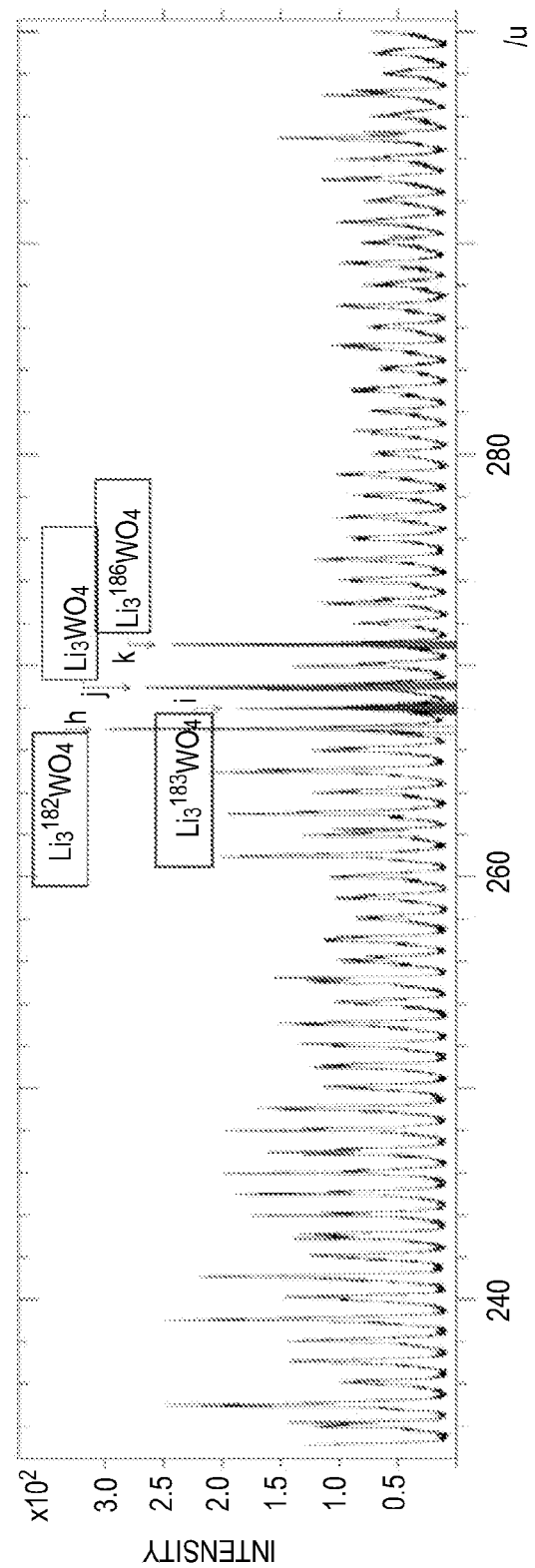
FIG. 14 is a graph representing the result of TOF-SIMS analysis.

FIGS. 12 to 14 represent the resulting TOF-SIMS spectra from the measurements. The fragment peaks with arrows a, b, c, d, e, and f indicate the presence of components originating from fluoroethylene carbonate (FEC). The fragment peaks with arrows g, h, i, and j indicate the presence of components originating from the heteropolyacid and/or heteropolyacid compounds.

(Swelling During High-Temperature Storage)

Each laminated battery of Examples 1-1 to 1-17 and Comparative Examples 1-1 to 1-3 was measured in regard to swelling during high-temperature storage, as follows. A thickness increase during 12-hour storage at 85° C. was measured after 3 hours of charging performed at 750 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage
Thickness after storage: Battery thickness after storage
Each laminated battery of Example 1-19 and Comparative Example 1-6 were measured in regard to swelling during high-temperature storage, as follows. A thickness increase during 12-hour storage at 85° C. was measured after 3 hours of charging performed at 700 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage
Thickness after storage: Battery thickness after storage
The laminated battery of Comparative Example 1-4 was measured in regard to swelling during high-temperature storage, as follows. A thickness increase during 12-hour storage at 85° C. was measured after 3 hours of charging performed at 650 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage
Thickness after storage: Battery thickness after storage
Each laminated battery of Example 1-18 and Comparative Example 1-5 was measured in regard to swelling during high-temperature storage, as follows. A thickness increase during 12-hour storage at 85° C. was measured after 3 hours of charging performed at 800 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage
Thickness after storage: Battery thickness after storage (Percentage Remaining Discharge Capacity after 300 Cycles)

Each laminated battery of Examples 1-1 to 1-17 and Comparative Examples 1-1 to 1-3 was measured in regard to percentage remaining discharge capacity after 300 cycles, as follows. Percentage remaining discharge capacity after 300 cycles of constant current discharge performed at 750 mA with a lower limit of 2.5 V after 3 hours of charging performed at 750 mA in a 23° C. environment with an upper limit of 4.2 V was determined as follows.

({Discharge capacity after 300 cycles/Discharge capacity after 1 cycle}×100%)

Each laminated battery of Example 1-19 and Comparative Example 1-6 was measured in regard to percentage remaining discharge capacity after 300 cycles, as follows. Percentage remaining discharge capacity after 300 cycles of constant current discharge performed at 700 mA with a lower limit of 2.5 V after 3 hours of charging performed at 700 mA in a 23° C. environment with an upper limit of 4.2 V was determined as follows.

({Discharge capacity after 300 cycles/Discharge capacity after 1 cycle}×100%)

The laminated battery of Comparative Example 1-4 was measured in regard to percentage remaining discharge capacity after 300 cycles, as follows. Percentage remaining discharge capacity after 300 cycles of constant current discharge performed at 650 mA with a lower limit of 2.5 V after 3 hours of charging performed at 650 mA in a 23° C. environment with an upper limit of 4.2 V was determined as follows.

({Discharge capacity after 300 cycles/Discharge capacity after 1 cycle}×100%)

Each laminated battery of Example 1-18 and Comparative Example 1-5 was measured in regard to percentage remaining discharge capacity after 300 cycles, as follows. Percentage remaining discharge capacity after 300 cycles of constant current discharge performed at 800 mA with a lower limit of 2.5 V after 3 hours of charging performed at 800 mA in a 23° C. environment with an upper limit of 4.2 V was determined as follows.

({Discharge capacity after 300 cycles/Discharge capacity after 1 cycle}×100%)

The measurement results are presented in Table 1.

TABLE 1

| | Heteropolyacid | | Positive electrode active material | Thickness of active material layer [μm] | Halogenated cyclic carbonate | |
|---|---|---|---|---|---|---|
| | Compound | Amount added [wt %] | | | Compound | Amount added [wt %] |
| Ex. 1-1 | SiW | 1.5 | $LiNi_{0.77}Co_{0.20}Al_{0.03}O_2$ | 40 | FEC | 1 |
| Ex. 1-2 | SiW | 1.5 | $LiNi_{0.77}Co_{0.20}Al_{0.03}O_2$ | 40 | FEC | 1 |
| Ex. 1-3 | SiW | 1.5 | $LiNi_{0.77}Co_{0.20}Al_{0.03}O_2$ | 40 | FEC | 1 |
| Ex. 1-4 | SiW | 0.5 | $LiNi_{0.77}Co_{0.20}Al_{0.03}O_2$ | 40 | FEC | 1 |
| Ex. 1-5 | SiW | 5 | $LiNi_{0.77}Co_{0.20}Al_{0.03}O_2$ | 40 | FEC | 1 |
| Ex. 1-6 | SiW | 6 | $LiNi_{0.77}Co_{0.20}Al_{0.03}O_2$ | 40 | FEC | 1 |
| Ex. 1-7 | PW | 1.5 | $LiNi_{0.77}Co_{0.20}Al_{0.03}O_2$ | 40 | FEC | 1 |
| Ex. 1-8 | SiMo | 1.5 | $LiNi_{0.77}Co_{0.20}Al_{0.03}O_2$ | 40 | FEC | 1 |
| Ex. 1-9 | PMo | 1.5 | $LiNi_{0.77}Co_{0.20}Al_{0.03}O_2$ | 40 | FEC | 1 |
| Ex. 1-10 | PMoV | 1.5 | $LiNi_{0.77}Co_{0.20}Al_{0.03}O_2$ | 40 | FEC | 1 |
| Ex. 1-11 | LiSiW | 1.5 | $LiNi_{0.77}Co_{0.20}Al_{0.03}O_2$ | 40 | FEC | 1 |
| Ex. 1-12 | SiW | 1.5 | $LiNi_{0.77}Co_{0.20}Al_{0.03}O_2$ | 40 | DFEC | 1 |
| Ex. 1-13 | SiW | 1.5 | $LiNi_{0.77}Co_{0.20}Al_{0.03}O_2$ | 40 | FEC | 0.5 |
| | | | | | CEC | 0.5 |
| Ex. 1-14 | SiW | 1.5 | $LiNi_{0.77}Co_{0.20}Al_{0.03}O_2$ | 40 | — | — |
| Ex. 1-15 | SiW | 1.5 | $LiNi_{0.77}Co_{0.20}Al_{0.03}O_2$ | 40 | — | — |
| Ex. 1-16 | SiW | 1.5 | $LiNi_{0.77}Co_{0.20}Al_{0.03}O_2$ | 40 | FEC | 1 |
| Ex. 1-17 | SiW | 1.5 | $LiNi_{0.77}Co_{0.20}Al_{0.03}O_2$ | 40 | FEC | 1 |
| Ex. 1-18 | SiW | 1.5 | $LiNi_{0.77}Co_{0.20}Al_{0.03}O_2$ | 80 | FEC | 5 |
| Ex. 1-19 | SiW | 1.5 | $LiCo_{0.99}Al_{0.01}O_2$ | 40 | FEC | 1 |
| Com. Ex. 1-1 | — | — | $LiNi_{0.77}Co_{0.20}Al_{0.03}O_2$ | 40 | FEC | 1 |
| Com. Ex. 1-2 | — | — | $LiNi_{0.77}Co_{0.20}Al_{0.03}O_2$ | 40 | — | — |
| Com. Ex. 1-3 | SiW | 1.5 | $LiNi_{0.77}Co_{0.20}Al_{0.03}O_2$ | 40 | — | — |
| Com. Ex. 1-4 | SiW | 1.5 | $LiNi_{0.77}Co_{0.20}Al_{0.03}O_2$ | 35 | — | — |
| Com. Ex. 1-5 | SiW | 1.5 | $LiNi_{0.77}Co_{0.20}Al_{0.03}O_2$ | 80 | — | — |
| Com. Ex. 1-6 | — | — | $LiCo_{0.99}Al_{0.01}O_2$ | 40 | FEC | 1 |

| | Unsaturated cyclic carbonate | | Phosphate coating | Boron-containing lithium salt | | Swelling during storage at 85° C. | Percentage remaining capacity after 300 cycles [%] |
|---|---|---|---|---|---|---|---|
| | Compound | Amount added [wt %] | | Compound | Amount added [wt %] | | |
| Ex. 1-1 | — | — | — | — | — | 21.6 | 91.1 |
| Ex. 1-2 | — | — | $Li_3PO_4$ | — | — | 16.2 | 90.9 |
| Ex. 1-3 | — | — | $Li_3PO_4$ | $LiBF_4$ | 0.5 | 10.8 | 90.6 |
| Ex. 1-4 | — | — | $Li_3PO_4$ | $LiBF_4$ | 0.5 | 21.1 | 91.9 |
| Ex. 1-5 | — | — | $Li_3PO_4$ | $LiBF_4$ | 0.5 | 8.6 | 86.1 |
| Ex. 1-6 | — | — | $Li_3PO_4$ | $LiBF_4$ | 0.5 | 8.0 | 81.1 |
| Ex. 1-7 | — | — | $Li_3PO_4$ | $LiBF_4$ | 0.5 | 10.7 | 90.5 |
| Ex. 1-8 | — | — | $Li_3PO_4$ | $LiBF_4$ | 0.5 | 10.6 | 90.6 |
| Ex. 1-9 | — | — | $Li_3PO_4$ | $LiBF_4$ | 0.5 | 10.4 | 90.5 |
| Ex. 1-10 | — | — | $Li_3PO_4$ | $LiBF_4$ | 0.5 | 10.3 | 90.4 |
| Ex. 1-11 | — | — | $Li_3PO_4$ | $LiBF_4$ | 0.5 | 10.7 | 90.7 |
| Ex. 1-12 | — | — | $Li_3PO_4$ | $LiBF_4$ | 0.5 | 11.9 | 90.7 |
| Ex. 1-13 | — | — | $Li_3PO_4$ | $LiBF_4$ | 0.5 | 7.6 | 89.5 |
| Ex. 1-14 | VC | 1 | $Li_3PO_4$ | $LiBF_4$ | 0.5 | 9.7 | 90.3 |
| Ex. 1-15 | VEC | 1 | $Li_3PO_4$ | $LiBF_4$ | 0.5 | 12.9 | 90.1 |
| Ex. 1-16 | — | — | $LiFePO_4$ | $LiBF_4$ | 0.5 | 11.3 | 90.8 |
| Ex. 1-17 | — | — | $Li_3PO_4$ | $LiBF_4$ | 0.4 | 12.4 | 90.9 |
| | | | | $LiB(C_2O_4)_2$ | 0.1 | | |
| Ex. 1-18 | — | — | $Li_3PO_4$ | $LiBF_4$ | 0.5 | 20.5 | 82.3 |
| Ex. 1-19 | — | — | $Li_3PO_4$ | $LiBF_4$ | 0.5 | 7.0 | 86.1 |
| Com. Ex. 1-1 | — | — | $Li_3PO_4$ | $LiBF_4$ | 0.5 | 35.0 | 92.1 |
| Com. Ex. 1-2 | VC | 1 | $Li_3PO_4$ | $LiBF_4$ | 0.5 | 28.0 | 91.9 |
| Com. Ex. 1-3 | — | — | $Li_3PO_4$ | $LiBF_4$ | 0.5 | 10.2 | 79.0 |
| Com. Ex. 1-4 | — | — | $Li_3PO_4$ | $LiBF_4$ | 0.5 | 10.1 | 87.7 |
| Com. Ex. 1-5 | — | — | $Li_3PO_4$ | $LiBF_4$ | 0.5 | 10.0 | 54.8 |
| Com. Ex. 1-6 | — | — | $Li_3PO_4$ | $LiBF_4$ | 0.5 | 10.3 | 84.5 |

SiW: $H_4SiW_{12}O_{40}$, PW: $H_3PW_{12}O_{40}$, SiMo: $H_4SiMo_{12}O_{40}$, PMo: $H_3PMo_{12}O_{40}$, PMoV: $H_4PMo_{11}VO_{40}$, LiSiW: $Li_4SiW_{12}O_{40}$ FEC: Fluoroethylene carbonate, DFEC: Difluoroethylene carbonate, CEC: Chloroethylene carbonate, VC: Vinylene carbonate, VEC: Vinyl ethylene carbonate As presented in Table 1, Examples 1-1 to 1-19 in which the electrolytic solution contained the halogenated cyclic carbonate or the heteropolyacid and/or heteropolyacid had improved swelling during high-temperature storage and improved charge and discharge cycle characteristics, compared with the corresponding Comparative Examples. It was also confirmed that the coating formed on the surface of the negative electrode removed from the battery after initial charging was amorphous and gelled.

In Comparative Example 1-1 in which the electrolytic solution contained halogenated cyclic carbonate but did not contain the heteropolyacid and/or heteropolyacid compound, swelling during high-temperature storage did not improve as much as in the corresponding Example. In Comparative Example 1-2 in which the electrolytic solution contained unsaturated cyclic carbonate but did not contain the heteropolyacid and/or heteropolyacid compound, swelling during high-temperature storage did not improve as much as in the corresponding Example. In Comparative Examples 1-3 to 1-5 in which the electrolytic solution contained the heteropolyacid and/or heteropolyacid compound but did not contain halogenated cyclic carbonate, cycle characteristics did not improve as much as in the corresponding Examples. In Comparative Example 1-6 in which the electrolytic solution contained halogenated cyclic carbonate but did not contain the heteropolyacid and/or heteropolyacid compound, swelling during high-temperature storage did not improve as much as in the corresponding Example.

Example 2

Example 2-1

The laminated battery of Example 2-1 was fabricated in the same manner as in Example 1-1, except that a separator having a thickness of 7 μm was used and coated with polyvinylidene fluoride on each side in 2 μm.

Example 2-2

The laminated battery of Example 2-2 was fabricated in the same manner as in Example 2-1, except that a lithium-nickel-cobalt-aluminum composite oxide ($LiNi_{0.77}Co_{0.20}Al_{0.03}O_2$) coated with lithium phosphate (phosphate) was used as the positive electrode active material. The lithium phosphate-coated lithium-nickel-cobalt-aluminum composite oxide was obtained by mixing lithium phosphate with the lithium-nickel-cobalt-aluminum composite oxide using a ball milling machine.

Example 2-3

The laminated battery of Example 2-3 was fabricated in the same manner as in Example 2-2, except that the electrolytic solution was prepared by mixing 0.5 mass % of lithium tetrafluoroborate as a boron-containing lithium salt, and that the amount of lithium hexafluorophosphate was reduced to compensate for the addition of the 0.5 mass % lithium tetrafluoroborate.

Example 2-4

The laminated battery of Example 2-4 was fabricated in the same manner as in Example 2-3, except that the electrolytic solution was prepared using diethyl carbonate in an increased amount to compensate for the reduced amount 0.5 mass % of silicotungstic acid ($H_4SiW_{12}O_{40}$) in the mixture.

Example 2-5

The laminated battery of Example 2-5 was fabricated in the same manner as in Example 2-3, except that the electrolytic solution was prepared using diethyl carbonate in a reduced amount to compensate for the increased amount 5 mass % of silicotungstic acid ($H_4SiW_{12}O_{40}$) in the mixture.

Example 2-6

The laminated battery of Example 2-6 was fabricated in the same manner as in Example 2-3, except that the electrolytic solution was prepared using diethyl carbonate in a reduced amount to compensate for the increased amount 6 mass % of silicotungstic acid ($H_4SiW_{12}O_{40}$) in the mixture.

Example 2-7

The laminated battery of Example 2-7 was fabricated in the same manner as in Example 2-3, except that the electrolytic solution was prepared by mixing phosphotungstic acid ($H_3PW_{12}O_{40}$) instead of silicotungstic acid ($H_4SiW_{12}O_4O$.

Example 2-8

The laminated battery of Example 2-8 was fabricated in the same manner as in Example 2-3, except that the electrolytic solution was prepared by mixing silicomolybdic acid ($H_4SiMo_{12}O_{40}$) instead of silicotungstic acid ($H_4SiW_{12}O_{40}$).

Example 2-9

The laminated battery of Example 2-9 was fabricated in the same manner as in Example 2-3, except that the electrolytic solution was prepared by mixing phosphomolybdic acid ($H_3PMo_{12}O_{40}$) instead of silicotungstic acid ($H_4SiW_{12}O_{40}$).

Example 2-10

The laminated battery of Example 2-10 was fabricated in the same manner as in Example 2-3, except that the electrolytic solution was prepared by mixing phosphovanadomolybdic acid ($H_4PMo_{11}VO_{40}$) instead of silicotungstic acid ($H_4SiW_{12}O_{40}$).

Example 2-11

The laminated battery of Example 2-11 was fabricated in the same manner as in Example 2-3, except that the electrolytic solution was prepared by mixing lithium silicotungstate ($Li_4SiW_{12}O_{40}$) instead of silicotungstic acid ($H_4SiW_{12}O_{40}$).

Example 2-12

The laminated battery of Example 2-12 was fabricated in the same manner as in Example 2-3, except that the electrolytic solution was prepared by mixing difluoroethylene carbonate (DFEC) instead of fluoroethylene carbonate (FEC).

Example 2-13

The laminated battery of Example 2-13 was fabricated in the same manner as in Example 2-3, except that the electrolytic solution was prepared by mixing 0.5 mass % of fluoroethylene carbonate (FEC), and 0.5 mass % of chloroethylene carbonate (CEC).

Example 2-14

The laminated battery of Example 2-14 was fabricated in the same manner as in Example 2-3, except that the electrolytic solution was prepared by mixing vinylene carbonate (VC) instead of fluoroethylene carbonate (FEC).

Example 2-15

The laminated battery of Example 2-15 was fabricated in the same manner as in Example 2-3, except that the electrolytic solution was prepared by mixing vinyl ethylene carbonate (VEC) instead of fluoroethylene carbonate (FEC).

Example 2-16

The laminated battery of Example 2-16 was fabricated in the same manner as in Example 2-3, except that a lithium-nickel-cobalt-aluminum composite oxide ($LiNi_{0.77}Co_{0.20}Al_{0.03}O_2$) coated with lithium iron phosphate ($LiFePO_4$; phosphate) was used as the positive electrode active material. The lithium iron phosphate ($LiFePO_4$)-coated lithium-nickel-cobalt-aluminum composite oxide was obtained by mixing lithium iron phosphate ($LiFePO_4$) with the lithium-nickel-cobalt-aluminum composite oxide using a ball milling machine.

Example 2-17

The laminated battery of Example 2-17 was fabricated in the same manner as in Example 2-3, except that the electrolytic solution was prepared by mixing 0.4 mass % of $LiBF_4$, and 0.1 mass % of $LiB(C_2O_4)_2$.

Example 2-18

The laminated battery of Example 2-18 was fabricated in the same manner as in Example 2-3, except that a positive electrode active material layer having a thickness of 80 μm on each side was formed during the fabrication of the positive electrode, and that the electrolytic solution was prepared by mixing ethylene carbonate in a reduced amount to compensate for the increased amount 5 mass % of fluoroethylene carbonate (FEC) in the mixture. The battery had a capacity of 800 mAh.

Example 2-19

The laminated battery of Example 2-19 was fabricated in the same manner as in Example 2-3, except that a lithium-cobalt-aluminum composite oxide ($LiCo_{0.99}Al_{0.01}O_2$) was used as the positive electrode active material. The battery had a capacity of 700 mAh.

Comparative Example 2-1

The laminated battery of Comparative Example 2-1 was fabricated in the same manner as in Example 2-3, except that the electrolytic solution was prepared using diethyl carbonate in an increased amount to compensate for the absence of a heteropolyacid compound in the mixture.

Comparative Example 2-2

The laminated battery of Comparative Example 2-2 was fabricated in the same manner as in Example 2-14, except that the electrolytic solution was prepared using diethyl carbonate in an increased amount to compensate for the absence of a heteropolyacid compound in the mixture.

Comparative Example 2-3

The laminated battery of Comparative Example 2-3 was fabricated in the same manner as in Example 2-3, except that the electrolytic solution was prepared using ethylene carbonate in an increased amount to compensate for the absence of fluoroethylene carbonate (FEC) in the mixture.

Comparative Example 2-4

The laminated battery of Comparative Example 2-4 was fabricated in the same manner as in Comparative Example 2-3, except that a positive electrode active material layer having a thickness of 35 μm on each side was formed during the fabrication of the positive electrode. The battery had a capacity of 650 mAh.

Comparative Example 2-5

The laminated battery of Comparative Example 2-5 was fabricated in the same manner as in Example 2-18, except that the electrolytic solution was prepared using ethylene carbonate in an increased amount to compensate for the absence of fluoroethylene carbonate (FEC) in the mixture.

Comparative Example 2-6

The laminated battery of Comparative Example 2-6 was fabricated in the same manner as in Example 2-19, except that the electrolytic solution was prepared using diethyl carbonate in an increased amount to compensate for the absence of a heteropolyacid compound in the mixture.

(Swelling During High-Temperature Storage)

Each laminated battery of Examples 2-1 to 2-17 and Comparative Examples 2-1 to 2-3 was measured in regard to swelling during high-temperature storage, as follows. A thickness increase during 12-hour storage at 85° C. was measured after 3 hours of charging performed at 750 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage

Thickness after storage: Battery thickness after storage

Each laminated battery of Example 2-19 and Comparative Example 2-6 were measured in regard to swelling during high-temperature storage, as follows. A thickness increase during 12-hour storage at 85° C. was measured after 3 hours of charging performed at 700 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage

Thickness after storage: Battery thickness after storage

The laminated battery of Comparative Example 2-4 was measured in regard to swelling during high-temperature storage, as follows. A thickness increase during 12-hour storage at 85° C. was measured after 3 hours of charging performed at 650 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage

Thickness after storage: Battery thickness after storage

Each laminated battery of Example 2-18 and Comparative Example 2-5 was measured in regard to swelling during high-temperature storage, as follows. A thickness increase during 12-hour storage at 85° C. was measured after 3 hours of charging performed at 800 mA in a 23° C. environment with an upper limit of 4.2 V. Swelling during high-temperature storage was determined as follows.

{[(Thickness after storage)−(Initial thickness)]/(Initial thickness)}×100%

Initial thickness: The thickness of the charged battery before storage

Thickness after storage: Battery thickness after storage (Percentage Remaining Discharge Capacity after 300 Cycles)

Each laminated battery of Examples 2-1 to 2-17 and Comparative Examples 2-1 to 2-3 was measured in regard to percentage remaining discharge capacity after 300 cycles, as follows. Percentage remaining discharge capacity after 300 cycles of constant current discharge performed at 750 mA with a lower limit of 2.5 V after 3 hours of charging performed at 750 mA in a 23° C. environment with an upper limit of 4.2 V was determined as follows.

({Discharge capacity after 300 cycles/Discharge capacity after 1 cycle}×100%)

Each laminated battery of Example 2-19 and Comparative Example 2-6 was measured in regard to percentage remaining discharge capacity after 300 cycles, as follows. Percentage remaining discharge capacity after 300 cycles of constant current discharge performed at 700 mA with a lower limit of 2.5 V after 3 hours of charging performed at 700 mA in a 23° C. environment with an upper limit of 4.2 V was determined as follows.

({Discharge capacity after 300 cycles/Discharge capacity after 1 cycle}×100%)

The laminated battery of Comparative Example 2-4 was measured in regard to percentage remaining discharge capacity after 300 cycles, as follows. Percentage remaining discharge capacity after 300 cycles of constant current discharge performed at 650 mA with a lower limit of 2.5 V after 3 hours of charging performed at 650 mA in a 23° C. environment with an upper limit of 4.2 V was determined as follows.

({Discharge capacity after 300 cycles/Discharge capacity after 1 cycle}×100%)

Each laminated battery of Example 2-18 and Comparative Example 2-5 was measured in regard to percentage remaining discharge capacity after 300 cycles, as follows. Percentage remaining discharge capacity after 300 cycles of constant current discharge performed at 800 mA with a lower limit of 2.5 V after 3 hours of charging performed at 800 mA in a 23° C. environment with an upper limit of 4.2 V was determined as follows.

({Discharge capacity after 300 cycles/Discharge capacity after 1 cycle}×100%)

The measurement results are presented in Table 2.

TABLE 2

| | Heteropolyacid | | Positive electrode active material | Thickness of active material layer [μm] | Halogenated cyclic carbonate | |
|---|---|---|---|---|---|---|
| | Compound | Amount added [wt %] | | | Compound | Amount added [wt %] |
| Ex. 2-1 | SiW | 1.5 | $LiNi_{0.77}Co_{0.20}Al_{0.03}O_2$ | 40 | FEC | 1 |
| Ex. 2-2 | SiW | 1.5 | $LiNi_{0.77}Co_{0.20}Al_{0.03}O_2$ | 40 | FEC | 1 |
| Ex. 2-3 | SiW | 1.5 | $LiNi_{0.77}Co_{0.20}Al_{0.03}O_2$ | 40 | FEC | 1 |
| Ex. 2-4 | SiW | 0.5 | $LiNi_{0.77}Co_{0.20}Al_{0.03}O_2$ | 40 | FEC | 1 |
| Ex. 2-5 | SiW | 5 | $LiNi_{0.77}Co_{0.20}Al_{0.03}O_2$ | 40 | FEC | 1 |
| Ex. 2-6 | SiW | 6 | $LiNi_{0.77}Co_{0.20}Al_{0.03}O_2$ | 40 | FEC | 1 |
| Ex. 2-7 | PW | 1.5 | $LiNi_{0.77}Co_{0.20}Al_{0.03}O_2$ | 40 | FEC | 1 |
| Ex. 2-8 | SiMo | 1.5 | $LiNi_{0.77}Co_{0.20}Al_{0.03}O_2$ | 40 | FEC | 1 |
| Ex. 2-9 | PMo | 1.5 | $LiNi_{0.77}Co_{0.20}Al_{0.03}O_2$ | 40 | FEC | 1 |
| Ex. 2-10 | PMoV | 1.5 | $LiNi_{0.77}Co_{0.20}Al_{0.03}O_2$ | 40 | FEC | 1 |
| Ex. 2-11 | LiSiW | 1.5 | $LiNi_{0.77}Co_{0.20}Al_{0.03}O_2$ | 40 | FEC | 1 |
| Ex. 2-12 | SiW | 1.5 | $LiNi_{0.77}Co_{0.20}Al_{0.03}O_2$ | 40 | DFEC | 1 |
| Ex. 2-13 | SiW | 1.5 | $LiNi_{0.77}Co_{0.20}Al_{0.03}O_2$ | 40 | FEC | 0.5 |
| | | | | | CEC | 0.5 |
| Ex. 2-14 | SiW | 1.5 | $LiNi_{0.77}Co_{0.20}Al_{0.03}O_2$ | 40 | — | — |
| Ex. 2-15 | SiW | 1.5 | $LiNi_{0.77}Co_{0.20}Al_{0.03}O_2$ | 40 | — | — |
| Ex. 2-16 | SiW | 1.5 | $LiNi_{0.77}Co_{0.20}Al_{0.03}O_2$ | 40 | FEC | 1 |
| Ex. 2-17 | SiW | 1.5 | $LiNi_{0.77}Co_{0.20}Al_{0.03}O_2$ | 40 | FEC | 1 |
| Ex. 2-18 | SiW | 1.5 | $LiNi_{0.77}Co_{0.20}Al_{0.03}O_2$ | 80 | FEC | 5 |
| Ex. 2-19 | SiW | 1.5 | $LiCo_{0.99}Al_{0.01}O_2$ | 40 | FEC | 1 |
| Com. Ex. 2-1 | — | — | $LiNi_{0.77}Co_{0.20}Al_{0.03}O_2$ | 40 | FEC | 1 |
| Com. Ex. 2-2 | — | — | $LiNi_{0.77}Co_{0.20}Al_{0.03}O_2$ | 40 | — | — |
| Com. Ex. 2-3 | SiW | 1.5 | $LiNi_{0.77}Co_{0.20}Al_{0.03}O_2$ | 40 | — | — |
| Com. Ex. 2-4 | SiW | 1.5 | $LiNi_{0.77}Co_{0.20}Al_{0.03}O_2$ | 35 | — | — |
| Com. Ex. 2-5 | SiW | 1.5 | $LiNi_{0.77}Co_{0.20}Al_{0.03}O_2$ | 80 | — | — |
| Com. Ex. 2-6 | — | — | $LiCo_{0.99}Al_{0.01}O_2$ | 40 | FEC | 1 |

| | Unsaturated cyclic carbonate | | Phosphate coating | Boron-containing lithium salt | | Swelling during storage at 85° C. | Percentage remaining capacity after 300 cycles [%] |
|---|---|---|---|---|---|---|---|
| | Compound | Amount added [wt %] | | Compound | Amount added [wt %] | | |
| Ex. 2-1 | — | — | — | — | — | 19.4 | 90.8 |
| Ex. 2-2 | — | — | $Li_3PO_4$ | — | — | 14.6 | 90.6 |
| Ex. 2-3 | — | — | $Li_3PO_4$ | $LiBF_4$ | 0.5 | 9.7 | 90.3 |

TABLE 2-continued

| | | | | | | | |
|---|---|---|---|---|---|---|---|
| Ex. 2-4 | — | — | Li$_3$PO$_4$ | LiBF$_4$ | 0.5 | 19.0 | 91.6 |
| Ex. 2-5 | — | — | Li$_3$PO$_4$ | LiBF$_4$ | 0.5 | 7.7 | 85.9 |
| Ex. 2-6 | — | — | Li$_3$PO$_4$ | LiBF$_4$ | 0.5 | 7.2 | 80.9 |
| Ex. 2-7 | — | — | Li$_3$PO$_4$ | LiBF$_4$ | 0.5 | 9.6 | 90.2 |
| Ex. 2-8 | — | — | Li$_3$PO$_4$ | LiBF$_4$ | 0.5 | 9.5 | 90.3 |
| Ex. 2-9 | — | — | Li$_3$PO$_4$ | LiBF$_4$ | 0.5 | 9.4 | 90.2 |
| Ex. 2-10 | — | — | Li$_3$PO$_4$ | LiBF$_4$ | 0.5 | 9.3 | 90.1 |
| Ex. 2-11 | — | — | Li$_3$PO$_4$ | LiBF$_4$ | 0.5 | 9.6 | 90.4 |
| Ex. 2-12 | — | — | Li$_3$PO$_4$ | LiBF$_4$ | 0.5 | 10.7 | 90.4 |
| Ex. 2-13 | — | — | Li$_3$PO$_4$ | LiBF$_4$ | 0.5 | 6.8 | 89.2 |
| Ex. 2-14 | VC | 1 | Li$_3$PO$_4$ | LiBF$_4$ | 0.5 | 8.7 | 90.0 |
| Ex. 2-15 | VEC | 1 | Li$_3$PO$_4$ | LiBF$_4$ | 0.5 | 11.6 | 89.8 |
| Ex. 2-16 | — | — | LiFePO$_4$ | LiBF$_4$ | 0.5 | 10.2 | 90.5 |
| Ex. 2-17 | — | — | Li$_3$PO$_4$ | LiBF$_4$ | 0.4 | 11.2 | 90.6 |
| | | | | LiB(C$_2$O$_4$)$_2$ | 0.1 | | |
| Ex. 2-18 | — | — | Li$_3$PO$_4$ | LiBF$_4$ | 0.5 | 18.5 | 82.1 |
| Ex. 2-19 | — | — | Li$_3$PO$_4$ | LiBF$_4$ | 0.5 | 6.3 | 85.9 |
| Com. Ex. 2-1 | — | — | Li$_3$PO$_4$ | LiBF$_4$ | 0.5 | 31.5 | 91.8 |
| Com. Ex. 2-2 | VC | 1 | Li$_3$PO$_4$ | LiBF$_4$ | 0.5 | 25.2 | 91.6 |
| Com. Ex. 2-3 | — | — | Li$_3$PO$_4$ | LiBF$_4$ | 0.5 | 9.2 | 78.8 |
| Com. Ex. 2-4 | — | — | Li$_3$PO$_4$ | LiBF$_4$ | 0.5 | 9.1 | 87.4 |
| Com. Ex. 2-5 | — | — | Li$_3$PO$_4$ | LiBF$_4$ | 0.5 | 9.0 | 54.7 |
| Com. Ex. 2-6 | — | — | Li$_3$PO$_4$ | LiBF$_4$ | 0.5 | 9.3 | 84.3 |

SiW: H$_4$SiW$_{12}$O$_{40}$, PW: H$_3$PW$_{12}$O$_{40}$, SiMo: H$_4$SiMo$_{12}$O$_{40}$, PMo: H$_3$PMo$_{12}$O$_{40}$, PMoV: H$_4$PMo$_{11}$VO$_{40}$, LiSiW: Li$_4$SiW$_{12}$O$_{40}$ FEC: Fluoroethylene carbonate, DFEC: Difluoroethylene carbonate, CEC: Chloroethylene carbonate, VC: Vinylene carbonate, VEC: Vinyl ethylene carbonate As presented in Table 2, Examples 2-1 to 2-19 in which the electrolytic solution contained the halogenated cyclic carbonate or the heteropolyacid and/or heteropolyacid had improved swelling during high-temperature storage and improved charge and discharge cycle characteristics compared with the corresponding Comparative Examples.

In Comparative Example 2-1 in which the electrolytic solution contained halogenated cyclic carbonate but did not contain the heteropolyacid and/or heteropolyacid compound, swelling during high-temperature storage did not improve as much as in the corresponding Example. In Comparative Example 2-2 in which the electrolytic solution contained unsaturated cyclic carbonate but did not contain the heteropolyacid and/or heteropolyacid compound, swelling during high-temperature storage did not improve as much as in the corresponding Example. In Comparative Examples 2-3 to 2-5 in which the electrolytic solution contained the heteropolyacid and/or heteropolyacid compound but did not contain halogenated cyclic carbonate, cycle characteristics did not improve as much as in the corresponding Examples. In Comparative Example 2-6 in which the electrolytic solution contained halogenated cyclic carbonate but did not contain the heteropolyacid and/or heteropolyacid compound, swelling during high-temperature storage did not improve as much as in the corresponding Example.

Example 3

Example 3-1

A lithium-cobalt-aluminum composite oxide (LiCo$_{0.99}$Al$_{0.01}$O$_2$) was used as the positive electrode active material. Note that the composition of the positive electrode active material is the composition in the material state, specifically, the composition in the fully discharged state of the battery. The laminated battery of Example 3-1 was fabricated in the same manner as in Example 1-1, except that the electrolytic solution was adjusted by mixing 1 mass % of silicotungstic acid (H$_4$SiW$_{12}$O$_{40}$; heteropolyacid) with a mixed solution of ethylene carbonate (34.2%), diethyl carbonate (51.3%), fluoroethylene carbonate (1%), chloroethylene carbonate (CEC; 0.3%), and lithium hexafluorophosphate (13.2%). The proportion in parenthesis is a mass ratio. The battery had a capacity of 900 mAh.

The laminated battery fabricated as above was measured in regard to swelling during high-temperature storage, as follows. A thickness increase during 24-hour storage at 85° C. was measured after 3 hours of charging performed at 900 mA in a 23° C. environment with an upper limit of 4.35 V. Swelling during high-temperature storage was determined as follows.

{[(Thickness after storage)−(Initial thickness)]/(Initial thickness)}×100%

Initial thickness: The thickness of the charged battery before storage

Thickness after storage: Battery thickness after storage

Example 3-2

A laminated battery was fabricated in the same manner as in Example 3-1, except that phosphotungstic acid (H$_3$PW$_{12}$O$_{40}$) was used as the heteropolyacid, instead of silicotungstic acid (H$_4$SiW$_{12}$O$_{40}$). Swelling during high-temperature storage was determined in the same manner as in Example 3-1.

Example 3-3

A laminated battery was fabricated in the same manner as in Example 3-1, except that silicomolybdic acid (H$_4$SiMo$_{12}$O$_{40}$) was used as the heteropolyacid, instead of silicotungstic acid (H$_4$SiW$_{12}$O$_{40}$). Swelling during high-temperature storage was determined in the same manner as in Example 3-1.

Example 3-4

A laminated battery was fabricated in the same manner as in Example 3-1, except that phosphomolybdic acid (H$_4$PMo$_{12}$O$_{40}$) was used as the heteropolyacid, instead of silicotungstic acid (H$_4$SiW$_{12}$O$_{40}$). Swelling during high-temperature storage was determined in the same manner as in Example 3-1.

Example 3-5

A laminated battery was fabricated in the same manner as in Example 3-1, except that phosphovanadomolybdic acid ($H_4PMo_{11}VO_{40}$) was used as the heteropolyacid, instead of silicotungstic acid ($H_4SiW_{12}O_{40}$). Swelling during high-temperature storage was determined in the same manner as in Example 3-1.

Example 3-6

A laminated battery was fabricated in the same manner as in Example 3-1, except that lithium silicotungstate ($Li_4SiW_{12}O_{40}$) was used as the heteropolyacid, instead of silicotungstic acid ($H_4SiW_{12}O_{40}$). Swelling during high-temperature storage was determined in the same manner as in Example 3-1.

Example 3-7

A laminated battery was fabricated in the same manner as in Example 3-1, except that a lithium-nickel-cobalt-manganese composite oxide ($LiNi_{0.5}Co_{0.2}Mn_{0.3}O_2$) was used as the positive electrode active material. Swelling during high-temperature storage was determined in the same manner as in Example 3-1.

Example 3-8

A laminated battery was fabricated in the same manner as in Example 3-1, except that a lithium-cobalt-aluminum composite oxide ($LiCo_{0.99}Al_{0.01}O_2$) surface-coated with lithium phosphate ($Li_3PO_4$) was used as the positive electrode active material. Swelling during high-temperature storage was determined in the same manner as in Example 3-1.

Comparative Example 3-1

A laminated battery was fabricated in the same manner as in Example 3-1, except that chloroethylene carbonate (CEC) and silicotungstic acid ($H_4SiW_{12}O_{40}$) were not added to the electrolytic solution, and that ethylene carbonate (EC) and diethyl carbonate (DEC) were used in increased amounts to compensate for the absence of chloroethylene carbonate (CEC) and silicotungstic acid.

Comparative Example 3-2

A laminated battery was fabricated in the same manner as in Example 3-1, except that chloroethylene carbonate (CEC) was not added to the electrolytic solution, and that ethylene carbonate (EC) was used in an increased amount to compensate for the absence of chloroethylene carbonate (CEC). Swelling during high-temperature storage was determined in the same manner as in Example 3-1.

Comparative Example 3-3

A laminated battery was fabricated in the same manner as in Example 3-1, except that silicotungstic acid ($H_4SiW_{12}O_{40}$) was not added to the electrolytic solution, and that diethyl carbonate (DEC) was used in an increased amount to compensate for the absence of silicotungstic acid. Swelling during high-temperature storage was determined in the same manner as in Example 3-1.

Comparative Example 3-4

A laminated battery was fabricated in the same manner as in Comparative Example 3-1, and swelling during high-temperature storage was determined in the same manner as in Comparative Example 1-1 except that the upper limit voltage of charging was changed to 4.2 V.

Comparative Example 3-5

A laminated battery was fabricated in the same manner as in Comparative Example 3-2, and swelling during high-temperature storage was determined in the same manner as in Comparative Example 1-1 except that the upper limit voltage of charging was changed to 4.2 V.

Comparative Example 3-6

A laminated battery was fabricated in the same manner as in Comparative Example 3-3, and swelling during high-temperature storage was determined in the same manner as in Comparative Example 1-1 except that the upper limit voltage of charging was changed to 4.2 V.

Comparative Example 3-7

A laminated battery was fabricated in the same manner as in Example 3-2, except that chloroethylene carbonate (CEC) was not added to the electrolytic solution, and that ethylene carbonate (EC) was used in an increased amount to compensate for the absence of chloroethylene carbonate (CEC). Swelling during high-temperature storage was determined in the same manner as in Example 3-1.

Comparative Example 3-8

A laminated battery was fabricated in the same manner as in Example 3-1, except that a lithium-cobalt-aluminum composite oxide ($LiCo_{0.99}Al_{0.01}O_2$) surface-coated with lithium phosphate ($Li_3PO_4$) was used as the positive electrode active material, and that the electrolytic solution did not contain chloroethylene carbonate (CEC) and silicotungstic acid ($H_4SiW_{12}O_{40}$) but instead contained ethylene carbonate (EC) and diethyl carbonate (DEC) in increased amounts to compensate for the absence of chloroethylene carbonate (CEC) and silicotungstic acid.

The measurement results are presented in Table 3.

TABLE 3

| | Positive electrode active material | | | Heteropolyacid | | Halogenated cyclic carbonate | | | Swelling |
|---|---|---|---|---|---|---|---|---|---|
| | Composite oxide | Surface coating | Nonaqueous electrolyte | Compound | Amount added [wt %] | Compound | Amount added [wt %] | Charge voltage [V] | during storage at 85° C. |
| Ex. 3-1 | $LiCo_{0.99}Al_{0.01}O_2$ | — | Electrolytic solution | SiW | 1 | CEC | 0.3 | 4.35 | 18.8 |
| Ex. 3-2 | $LiCo_{0.99}Al_{0.01}O_2$ | — | Electrolytic solution | PW | 1 | CEC | 0.3 | 4.35 | 18.6 |
| Ex. 3-3 | $LiCo_{0.99}Al_{0.01}O_2$ | — | Electrolytic solution | SiMo | 1 | CEC | 0.3 | 4.35 | 18.5 |

TABLE 3-continued

| | Positive electrode active material | | | Heteropolyacid | | Halogenated cyclic carbonate | | | Swelling |
|---|---|---|---|---|---|---|---|---|---|
| | Composite oxide | Surface coating | Nonaqueous electrolyte | Compound | Amount added [wt %] | Compound | Amount added [wt %] | Charge voltage [V] | during storage at 85° C. |
| Ex. 3-4 | $LiCo_{0.99}Al_{0.01}O_2$ | — | Electrolytic solution | PMoV | 1 | CEC | 0.3 | 4.35 | 18.3 |
| Ex. 3-5 | $LiCo_{0.99}Al_{0.01}O_2$ | — | Electrolytic solution | PMoV | 1 | CEC | 0.3 | 4.35 | 18.2 |
| Ex. 3-6 | $LiCo_{0.99}Al_{0.01}O_2$ | — | Electrolytic solution | LiSiW | 1 | CEC | 0.3 | 4.35 | 18.7 |
| Ex. 3-7 | $LiNi_{0.50}Co_{0.20}Mn_{0.30}O_2$ | — | Electrolytic solution | SiW | 1 | CEC | 0.3 | 4.35 | 21.6 |
| Ex. 3-8 | $LiCo_{0.99}Al_{0.01}O_2$ | $Li_3PO_4$ | Electrolytic solution | SiW | 1 | CEC | 0.3 | 4.35 | 16.9 |
| Com. Ex. 3-1 | $LiCo_{0.99}Al_{0.01}O_2$ | — | Electrolytic solution | — | — | — | — | 4.35 | 63.4 |
| Com. Ex. 3-2 | $LiCo_{0.99}Al_{0.01}O_2$ | — | Electrolytic solution | SiW | 1 | — | — | 4.35 | 51.4 |
| Com. Ex. 3-3 | $LiCo_{0.99}Al_{0.01}O_2$ | — | Electrolytic solution | — | — | CEC | 0.3 | 4.35 | 62.9 |
| Com. Ex. 3-4 | $LiCo_{0.99}Al_{0.01}O_2$ | — | Electrolytic solution | — | — | — | — | 4.2 | 22.2 |
| Com. Ex. 3-5 | $LiCo_{0.99}Al_{0.01}O_2$ | — | Electrolytic solution | SiW | 1 | — | — | 4.2 | 9.7 |
| Com. Ex. 3-6 | $LiCo_{0.99}Al_{0.01}O_2$ | — | Electrolytic solution | — | — | CEC | 0.3 | 4.2 | 15.5 |
| Com. Ex. 3-7 | $LiNi_{0.50}Co_{0.20}Mn_{0.30}O_2$ | — | Electrolytic solution | SiW | 1 | — | — | 4.35 | 59.1 |
| Com. Ex. 3-8 | $LiCo_{0.99}Al_{0.01}O_2$ | $Li_3PO_4$ | Electrolytic solution | — | — | — | — | 4.35 | 57.1 |

SiW: $H_4SiW_{12}O_{40}$, PW: $H_3PW_{12}O_{40}$, SiMo: $H_4SiMo_{12}O_{40}$, PMo: $H_3PMo_{12}O_{40}$, PMoV: $H_4PMo_{11}VO_{40}$, LiSiW: $Li_4SiW_{12}O_{40}$
CEC: Chloroethylene carbonate As presented in Table 3, in Examples 3-1 to 3-8, swelling during high-temperature storage was found to improve with the use of the electrolytic solution that contained chloroethylene carbonate (CEC) and the heteropolyacid and/or heteropolyacid compound, even with the high upper limit charge voltage of 4.35 V.

By comparing Comparative Examples 3-1 to 3-3 and Comparative Examples 3-4 to 3-6, it can be seen that increasing the upper limit charge voltage from 4.2 V to 4.35 V leads to more serious battery swelling during high-temperature storage. However, by comparing, for example, Example 3-1 and Comparative Examples 3-1 to 3-3, it can be seen that battery swelling during high-temperature storage can be suppressed when the heteropolyacid and chloroethylene carbonate (CEC) are added to the electrolytic solution in the battery, even with the upper limit charge voltage of 4.35 V.

It was also found from the results of Examples 3-7 and 3-8 that desirable effects could be obtained with the positive electrode active materials of different configurations. It was also found that addition of other heteropolyacids as in Examples 3-2 to 3-5, or addition of a heteropolyacid compound as in Example 3-6 was also effective at suppressing battery swelling.

In Comparative Examples in which the electrolytic solution contained neither heteropolyacid and/or heteropolyacid compounds nor halogenated cyclic carbonates, swelling during high-temperature storage did not improve as much as in the corresponding Examples.

Example 4

Examples 4-1 to 4-8, and Comparative Examples 4-1 to 4-8

Swelling during high-temperature storage was determined for laminated batteries fabricated in the same manner as in Examples 3-1 to 3-7 and Comparative Examples 3-1 to 3-7 except for using a separator that had a 2-μm polyvinylidene fluoride (PVdF) coating on the both sides of a 7 μm-thick microporous polyethylene film.

The measurement results are presented in Table 4.

TABLE 4

| | Positive electrode active material | | | Heteropolyacid | | Halogenated cyclic carbonate | | | Swelling |
|---|---|---|---|---|---|---|---|---|---|
| | Composite oxide | Surface coating | Nonaqueous electrolyte | Compound | Amount added [wt %] | Compound | Amount added [wt %] | Charge voltage [V] | during storage at 85° C. |
| Ex. 4-1 | $LiCo_{0.99}Al_{0.01}O_2$ | — | Gel electrolyte | SiW | 1 | CEC | 0.3 | 4.35 | 15.7 |
| Ex. 4-2 | $LiCo_{0.99}Al_{0.01}O_2$ | — | Gel electrolyte | PW | 1 | CEC | 0.3 | 4.35 | 15.5 |
| Ex. 4-3 | $LiCo_{0.99}Al_{0.01}O_2$ | — | Gel electrolyte | SiMo | 1 | CEC | 0.3 | 4.35 | 15.4 |
| Ex. 4-4 | $LiCo_{0.99}Al_{0.01}O_2$ | — | Gel electrolyte | PMoV | 1 | CEC | 0.3 | 4.35 | 15.3 |
| Ex. 4-5 | $LiCo_{0.99}Al_{001}O_2$ | — | Gel electrolyte | PMoV | 1 | CEC | 0.3 | 4.35 | 15.2 |
| Ex. 4-6 | $LiCo_{0.99}Al_{0.01}O_2$ | — | Gel electrolyte | LiSiW | 1 | CEC | 0.3 | 4.35 | 15.6 |
| Ex. 4-7 | $LiNi_{0.50}Co_{0.20}Mn_{0.30}O_2$ | — | Gel electrolyte | SiW | 1 | CEC | 0.3 | 4.35 | 18.0 |
| Ex. 4-8 | $LiCo_{0.99}Al_{0.01}O_2$ | $Li_3PO_4$ | Gel electrolyte | SiW | 1 | CEC | 0.3 | 4.35 | 14.1 |
| Com. Ex. 4-1 | $LiCo_{0.99}Al_{0.01}O_2$ | — | Gel electrolyte | — | — | — | — | 4.35 | 52.8 |
| Com. Ex. 4-2 | $LiCo_{0.99}Al_{0.01}O_2$ | — | Gel electrolyte | SiW | 1 | — | — | 4.35 | 42.8 |
| Com. Ex. 4-3 | $LiCo_{0.99}Al_{0.01}O_2$ | — | Gel electrolyte | — | — | CEC | 0.3 | 4.35 | 52.4 |
| Com. Ex. 4-4 | $LiCo_{0.99}Al_{0.01}O_2$ | — | Gel electrolyte | — | — | — | — | 4.2 | 18.5 |
| Com. Ex. 4-5 | $LiCo_{0.99}Al_{0.01}O_2$ | — | Gel electrolyte | SiW | 1 | — | — | 4.2 | 8.1 |
| Com. Ex. 4-6 | $LiCo_{0.99}Al_{0.01}O_2$ | — | Gel electrolyte | — | — | CEC | 0.3 | 4.2 | 12.9 |

TABLE 4-continued

| Positive electrode active material | | Nonaqueous electrolyte | Heteropolyacid | | Halogenated cyclic carbonate | | Charge voltage [V] | Swelling during storage at 85° C. |
|---|---|---|---|---|---|---|---|---|
| Composite oxide | Surface coating | | Compound | Amount added [wt %] | Compound | Amount added [wt %] | | |
| Com. Ex. 4-7 | $LiNi_{0.50}Co_{0.20}Mn_{0.30}O_2$ | — | Gel electrolyte | SiW | 1 | — | — | 4.35 | 49.1 |
| Com. Ex. 4-8 | $LiCo_{0.99}Al_{0.01}O_2$ | $Li_3PO_4$ | Gel electrolyte | — | — | — | — | 4.35 | 47.5 |

SiW: $H_4SiW_{12}O_{40}$, PW: $H_3PW_{12}O_{40}$, SiMo: $H_4SiMo_{12}O_{40}$, PMo: $H_3PMo_{12}O_{40}$, PMoV: $H_4PMo_{11}VO_{40}$, LiSiW: $Li_4SiW_{12}O_{40}$
CEC: Chloroethylene carbonate As presented in Table 4, in Examples 4-1 to 4-8 in which the gel electrolyte was used as a nonaqueous electrolyte that contained chloroethylene carbonate (CEC) and the heteropolyacid and/or heteropolyacid compound, swelling during high-temperature storage was found to improve even with the high upper limit charge voltage of 4.35 V. As can be seen from the results of Comparative Examples 4-1 to 4-3 and Comparative Examples 4-4 to 4-6, battery swelling during high-temperature storage becomes more serious when the upper limit charge voltage is increased from 4.2 V to 4.35 V, even in batteries that use the gel electrolyte. However, as demonstrated in the Examples, it was possible to suppress battery swelling with the use of chloroethylene carbonate (CEC) and the heteropolyacid and/or heteropolyacid compound in combination, even with the upper limit charge voltage of 4.35 V.

Further, as in Example 3, battery swelling during high-temperature storage could not be suppressed in Comparative Examples in which, despite the use of the gel electrolyte in the batteries, chloroethylene carbonate (CEC) and the heteropolyacid and/or heteropolyacid compound were not used in combination, when the upper limit charge voltage was 4.35 V.

6. Other Embodiments

While the application has been described with respect to certain embodiments and examples, the application is not limited by these embodiments and examples, and various modifications and applications are possible within the scope of the application.

For example, while the foregoing Embodiments and Examples described batteries of a laminate film type, batteries of a cylindrical battery structure, batteries of a wound electrode structure, and batteries of a stacked electrode structure, the application is not limited by these. For example, the application is also applicable to and equally effective in other battery structures, including batteries of rectangular, coin, and button structures.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A nonaqueous electrolyte battery comprising:
a positive electrode;
a negative electrode;
a nonaqueous electrolyte that includes a solvent and an electrolyte salt, the solvent including a halogenated cyclic carbonate of the Formula (1) below, or at least one of unsaturated cyclic carbonates of the Formulae (2) and (3) below; and
a heteropolymolybdic acid and/or a heteropolymolybdic acid compound contained in the battery,

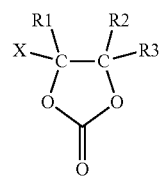
(1)

where X is a F group or a Cl group, R1 and R2 are each independently a $C_nH_{2n+1}$ group ($0 \leq n \leq 4$), and R3 is $C_nH_{2n+1-m}X_m$ ($0 \leq n \leq 4$, $0 \leq m \leq 2n+1$),

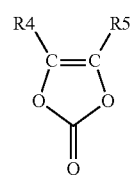
(2)

where R4 and R5 are each independently a $C_nH_{2n+1}$ group ($0 \leq n \leq 4$),

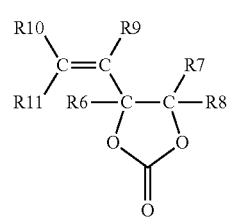
(3)

where R6 to R11 are each independently a $C_nH_{2n+1}$ group ($0 \leq n \leq 4$), and
wherein the electrolyte salt includes a lithium salt, and
wherein an upper limit charge voltage of the nonaqueous electrolyte battery is 4.35 V.

2. The nonaqueous electrolyte battery according to claim 1, wherein the heteropolymolybdic acid and/or the heteropolymolybdic acid compound include a Mo polyatom, and in which some of the polyatoms are replaced with at least one element selected from element group (b) consisting of Ti, Cr, Mn, Fe, Co, Ni, Cu, Zn, Ga, Zr, Tc, Rh, Cd, In, Sn, Ta, Re, Tl, and Pb.

3. The nonaqueous electrolyte battery according to claim 1, wherein the heteropolymolybdic acid and/or the heteropolymolybdic acid compound are of the following Formulae (A) to (D):

$$H_xA_y[BD_{12}O_{40}]\cdot zH_2O \quad (A)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is molybdenum (Mo), x, y, and z satisfy $0 \le x \le 4$, $0 \le y \le 4$, $0 \le z \le 50$, where at least one of x and y is not 0;

$$H_xA_y[BD_6O_{24}]\cdot zH_2O \quad (B)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is molybdenum (Mo), x, y, and z satisfy $0 \le x \le 8$, $0 \le y \le 8$, $0 \le z \le 50$, where at least one of x and y is not 0;

$$H_xA_y[B_2D_{18}O_{62}]\cdot zH_2O \quad (C)$$

where A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is molybdenum (Mo), x, y, and z satisfy $0 \le x \le 8$, $0 \le y \le 8$, $0 \le z \le 50$, where at least one of x and y is not 0; and $$H_xA_y[B_5D_{30}O_{110}]\cdot zH_2O \quad (D)$$

where A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is molybdenum (Mo), x, y, and z satisfy $0 \le x \le 15$, $0 \le y \le 15$, $0 \le z \le 50$, where at least one of x and y is not 0.

4. The nonaqueous electrolyte battery according to claim 1, wherein the halogenated cyclic carbonate is 4-fluoro-1,3-dioxolan-2-one.

5. The nonaqueous electrolyte battery according to claim 1, wherein the unsaturated cyclic carbonate is vinylene carbonate.

6. The nonaqueous electrolyte battery according to claim 1, wherein the positive electrode includes, as a positive electrode active material, a lithium composite oxide that has a layered rock-salt crystal structure of the average composition represented by $Li_xMO_2$ (where M is at least one element selected from cobalt (Co), nickel (Ni), aluminum (Al), manganese (Mn), boron (B), magnesium (Mg), silicon (Si), phosphorus (P), sulfur (S), titanium (Ti), chromium (Cr), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb), and antimony (Sb), and $x \le 0.45$ in the fully charged state), and
wherein the solvent includes 4-chloro-1,3-dioxolan-2-one as the halogenated cyclic carbonate.

7. The nonaqueous electrolyte battery according to claim 1, wherein the positive electrode includes, as a positive electrode active material, a positive electrode material that includes a phosphate-containing coating layer formed on at least a portion of a surface of a lithium composite oxide that contains lithium and a transition metal.

8. The nonaqueous electrolyte battery according to claim 1, wherein the nonaqueous electrolyte is a gel electrolyte that comprises:
an electrolytic solution that includes the solvent and the electrolyte salt; and
a polymer compound that swells by absorbing the electrolytic solution.

9. A nonaqueous electrolyte battery comprising:
a positive electrode;
a negative electrode; and
a nonaqueous electrolyte that includes a solvent and an electrolyte salt,
wherein the negative electrode includes:
a gelled first negative electrode coating that contains an amorphous heteropolymolybdic acid and/or an amorphous heteropolymolybdic acid compound including one or more polyelements; and
a second negative electrode coating that originates from a halogenated cyclic carbonate of the Formula (1) below, or in at least one of unsaturated cyclic carbonates of Formulae (2) and (3) below,

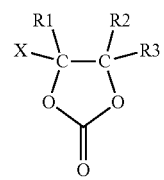
(1)

where X is a F group or a Cl group, R1 and R2 are each independently a $C_nH_{2n+1}$ group ($0 \le n \le 4$), and R3 is $C_nH_{2n+1-m}X_n$ ($0 \le n \le 4$, $0 \le m \le 2n+1$),

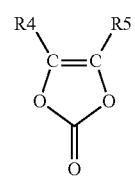
(2)

where R4 and R5 are each independently a $C_nH_{2n+1}$ group ($0 \le n \le 4$),

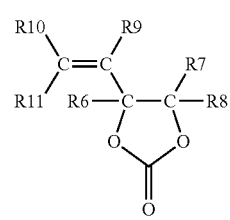
(3)

where R6 to R11 are each independently a $C_nH_{2n+1}$ group ($0 \le n \le 4$), and
wherein the electrolyte salt includes a lithium salt.

10. The nonaqueous electrolyte battery according to claim 9, wherein the first negative electrode coating is formed by absorption of the electrolytic solution by the amorphous heteropolymolybdic acid and/or the amorphous heteropolymolybdic acid compound deposited into a three-dimensional mesh structure.

11. The nonaqueous electrolyte battery according to claim 10, wherein the first negative electrode coating and the second negative electrode coating are formed in a laminar fashion.

12. The nonaqueous electrolyte battery according to claim 10, wherein the first negative electrode coating is formed as a deeper layer, and wherein the second negative electrode coating is formed as a surface layer.

13. The nonaqueous electrolyte battery according to claim 9, wherein the positive electrode includes, as a positive electrode active material, a lithium composite oxide that has a layered rock-salt crystal structure of the average composition represented by $Li_xMO_2$ (where M is at least one element selected from cobalt (Co), nickel (Ni), aluminum (Al), manganese (Mn), boron (B), magnesium (Mg), silicon (Si), phosphorus (P), sulfur (S), titanium (Ti), chromium (Cr), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb), and antimony (Sb), and $x \leq 0.45$ in the fully charged state), and wherein positive electrode includes:
a gelled first positive electrode coating that includes an amorphous polyacid and/or an amorphous polyacid compound including one or more polyelements; and
a second positive electrode coating that includes a coating originating from 4-chloro-1,3-dioxolan-2-one.

14. The nonaqueous electrolyte battery according to claim 1, wherein the lithium salt is a boron-containing lithium salt.

15. The nonaqueous electrolyte battery according to claim 9, wherein an upper limit charge voltage of the nonaqueous electrolyte battery is 4.35 V.

16. The nonaqueous electrolyte battery according to claim 1, wherein a voltage of the nonaqueous electrolyte battery in a fully charged state is 4.30 V to 4.35 V.

17. The nonaqueous electrolyte battery according to claim 9, wherein a voltage of the nonaqueous electrolyte battery in a fully charged state is 4.30 V to 4.35 V.

* * * * *